United States Patent [19]

Shimada et al.

[11] Patent Number: 5,107,278
[45] Date of Patent: Apr. 21, 1992

[54] IMAGE FORMING APPARATUS

[75] Inventors: Kazuyuki Shimada, Chofu; Yoshiharu Niito, Yokohama; Keiichi Iwasaki, Suita; Yukitoshi Kiya, Kawasaki; Hideo Azumai, Yokohama; Takahiro Yagishita, Yokohama; Masayoshi Miyamoto, Yokohama, all of Japan

[73] Assignee: Ricoh Company, Ltd., Tokyo, Japan

[21] Appl. No.: 603,958

[22] Filed: Oct. 25, 1990

[30] Foreign Application Priority Data

Oct. 31, 1989 [JP] Japan .................................. 1-284444

[51] Int. Cl.⁵ .......................... G01D 9/42; H04B 1/52
[52] U.S. Cl. ...................................... 346/108; 371/27
[58] Field of Search .................... 346/1.1, 108; 371/27, 371/21.1, 21.3, 21.4

[56] References Cited

U.S. PATENT DOCUMENTS 4,688,223  8/1987  Motika et al. ......................... 371/27

FOREIGN PATENT DOCUMENTS 63-167384  7/1988  Japan .

Primary Examiner—Mark J. Reinhart
Attorney, Agent, or Firm—Cooper & Dunham

[57] ABSTRACT

An image forming apparatus includes an image forming part for forming an image described by a video signal on a recording sheet by carrying out an image forming operation which includes scans in main and sub scan directions, a storage part for storing test pattern data which describes at least one test pattern to be formed on the recording sheet, a generator for generating a generation interval of the video signal in the main and sub scan directions responsive to the test pattern data stored in the storage part, and a controller for controlling the image forming operation of the image forming part by supplying to the image forming part the video signal which describes an arbitrary test pattern and is generated based on the test pattern data read from the storage part with the generation interval generated by the generator.

7 Claims, 21 Drawing Sheets

FIG. 11

FIG.20 MSCD
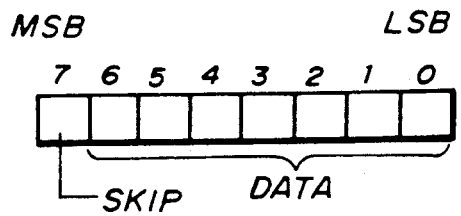
FIG.21
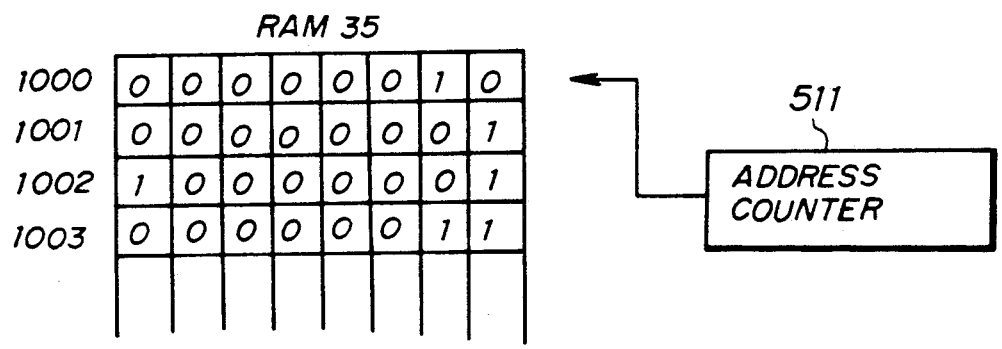
FIG.22
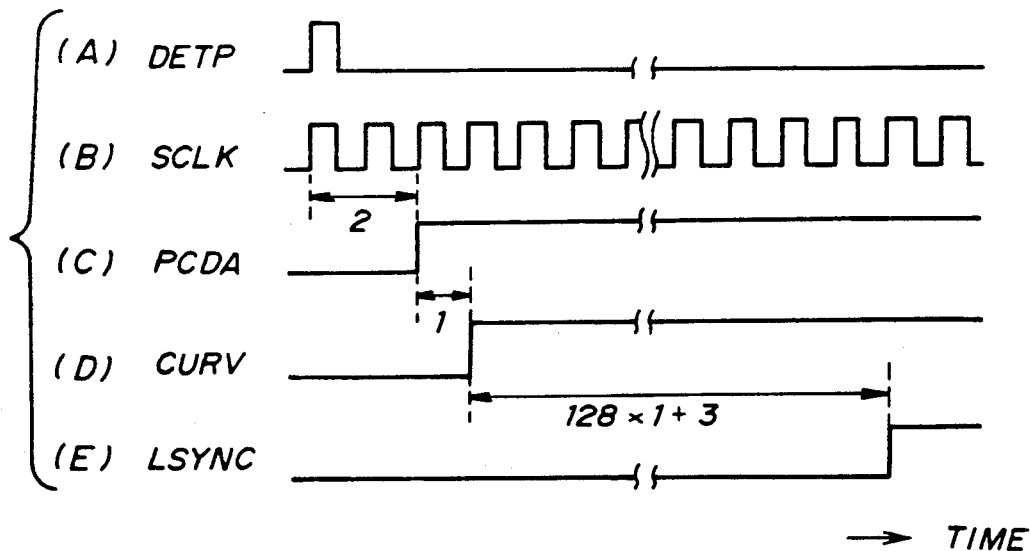

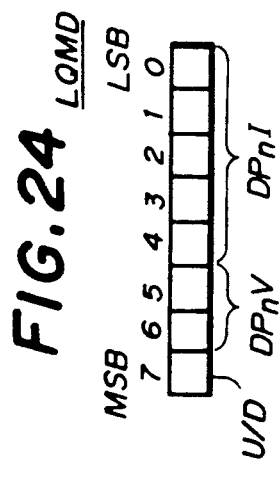
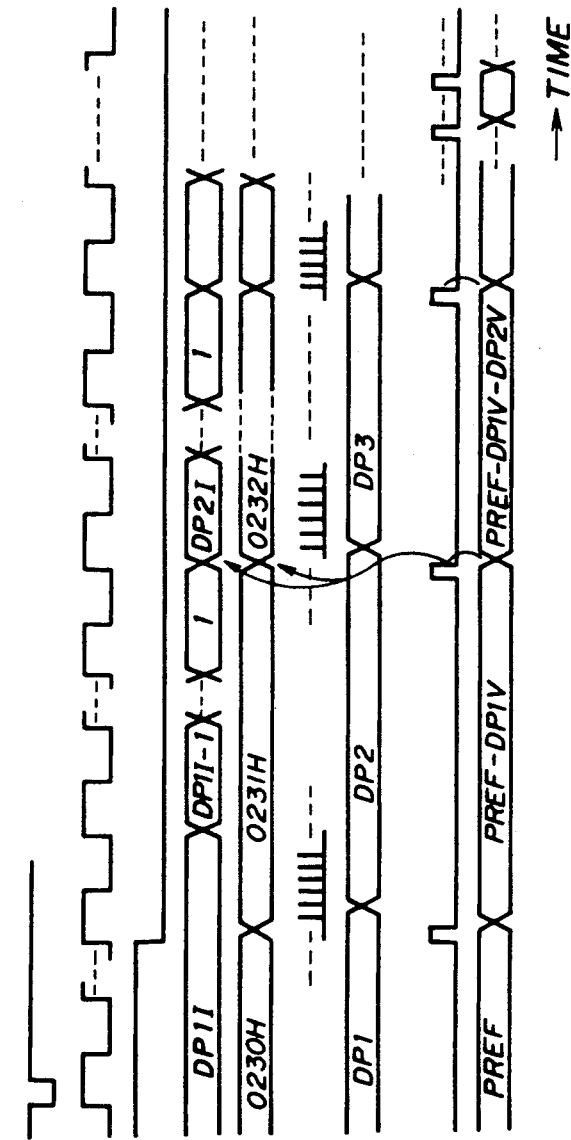
FIG. 24
FIG. 25

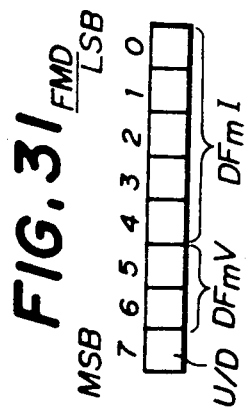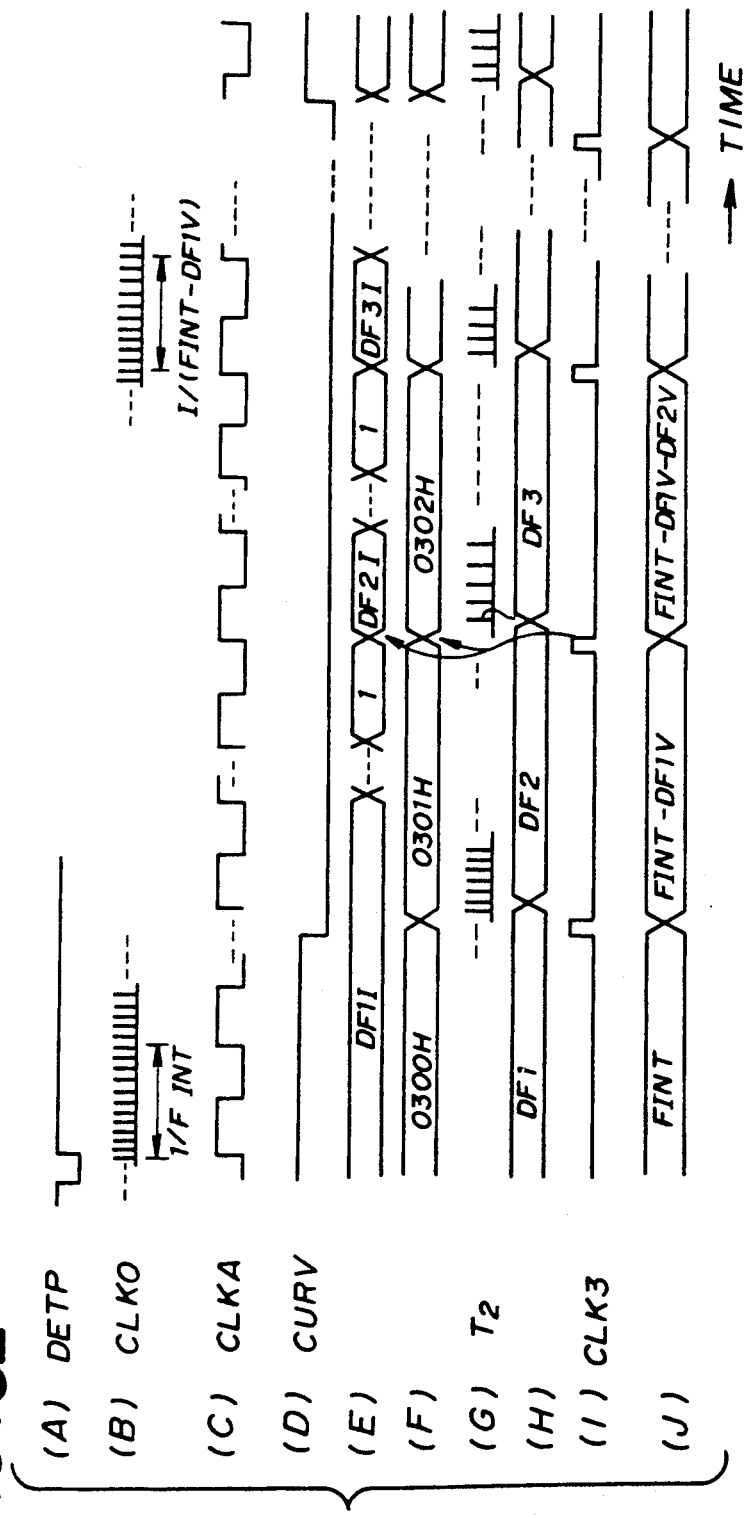

IMAGE FORMING APPARATUS

BACKGROUND OF THE INVENTION

The present invention generally relates to image forming apparatuses, and more particularly to an image forming apparatus such as a laser beam printer and a digital copying machine.

In an image forming apparatus such as a laser printer, the ON/OFF state of a laser diode is controlled depending on a video signal which is synchronized to a pixel clock signal, so as to modulate a laser beam which is emitted from the laser diode by the video signal. The laser beam is periodically deflected by a polygonal mirror, for example, and scans a photoconductive or photosensitive body so as to form an image. Generally, the photoconductive or photosensitive body is shaped in a form of a drum or a belt.

According to a well known optical scanning method using the laser beam, the laser beam emitted from the laser diode is deflected by the polygonal mirror to scan the photoconductive drum in a main scan direction. At the same time, the photoconductive drum is rotated a predetermined angle in a direction perpendicular to the main scan direction, that is, in a sub scan direction.

There is a conventional image forming apparatus which is provided with a function of generating a test video signal which is related to a test pattern. By carrying out the image forming apparatus responsive to this test video signal, it is possible to check the operating state of the image forming apparatus and the picture quality which can be obtained.

However, the conventional image forming apparatus which has the function of generating the test video signal uses a test pattern generator circuit for generating the test video signal. For this reason, the test pattern which is described by the test video signal generated from the test pattern generator circuit is a fixed repetition pattern having four dots in the main scan direction and four dots in the sub scan direction, for example.

For this reason, in order to modify the kind of test pattern to be used, it is necessary to change the test pattern generator circuit. As a result, there is a problem in that the test pattern cannot be modified with ease and the flexibility of the image forming apparatus is poor.

SUMMARY OF THE INVENTION

Accordingly, it is a general object of the present invention to provide a novel and useful image forming apparatus in which the problem described above is eliminated.

Another and more specific object of the present invention is to provide an image forming apparatus comprising image forming means for forming an image described by a video signal on a recording sheet by carrying out an image forming operation which includes scans in main and sub scan directions, storage means for storing test pattern data which describes at least one test pattern to be formed on the recording sheet, generator means coupled to the storage means for generating a generation interval of the video signal in the main and sub scan directions responsive to the test pattern data stored in the storage means, and control means coupled to the storage means and the generator means for controlling the image forming operation of the image forming means by supplying to the image forming means the video signal which describes an arbitrary test pattern and is generated based on the test pattern data read from the storage means with the generation interval generated by the generator means. According to the image forming apparatus of the present invention, it is possible to register arbitrary test patterns and selectively form one of the test patterns when checking the operation of the image forming apparatus. Hence, the efficiency with which the operation of the image forming apparatus is checked is greatly improved over the prior art. In addition, it is possible to even set the line width and interval of the test pattern, and various kinds of tests can be carried out with ease by forming desired test patterns on the recording sheet.

Other objects and further features of the present invention will be apparent from the following detailed description when read in conjunction with the accompanying drawings.

BRIEF DESCRIPTION OF THE DRAWINGS

FIG. 11 is a system block diagram showing an embodiment of a test pattern generator shown in FIG. 9 together with a register group of an internal register;

FIG. 20 shows a data format of a main scan control data;

FIG. 21 is a diagram for explaining a transfer of a main scan control data into the RAM;

FIG. 22 is a timing chart for explaining an operation of a sequencer shown in FIG. 18;

FIG. 24 shows a data format of a light quantity modulation data;

FIG. 25 is a timing chart for explaining an operation of the light quantity modulator shown in FIG. 23;

FIG. 31 shows a data format of a frequency modulation data;

FIG. 32 is a timing chart for explaining an operation of the frequency modulator shown in FIG. 30.

DESCRIPTION OF THE PREFERRED EMBODIMENTS

Figure 1:
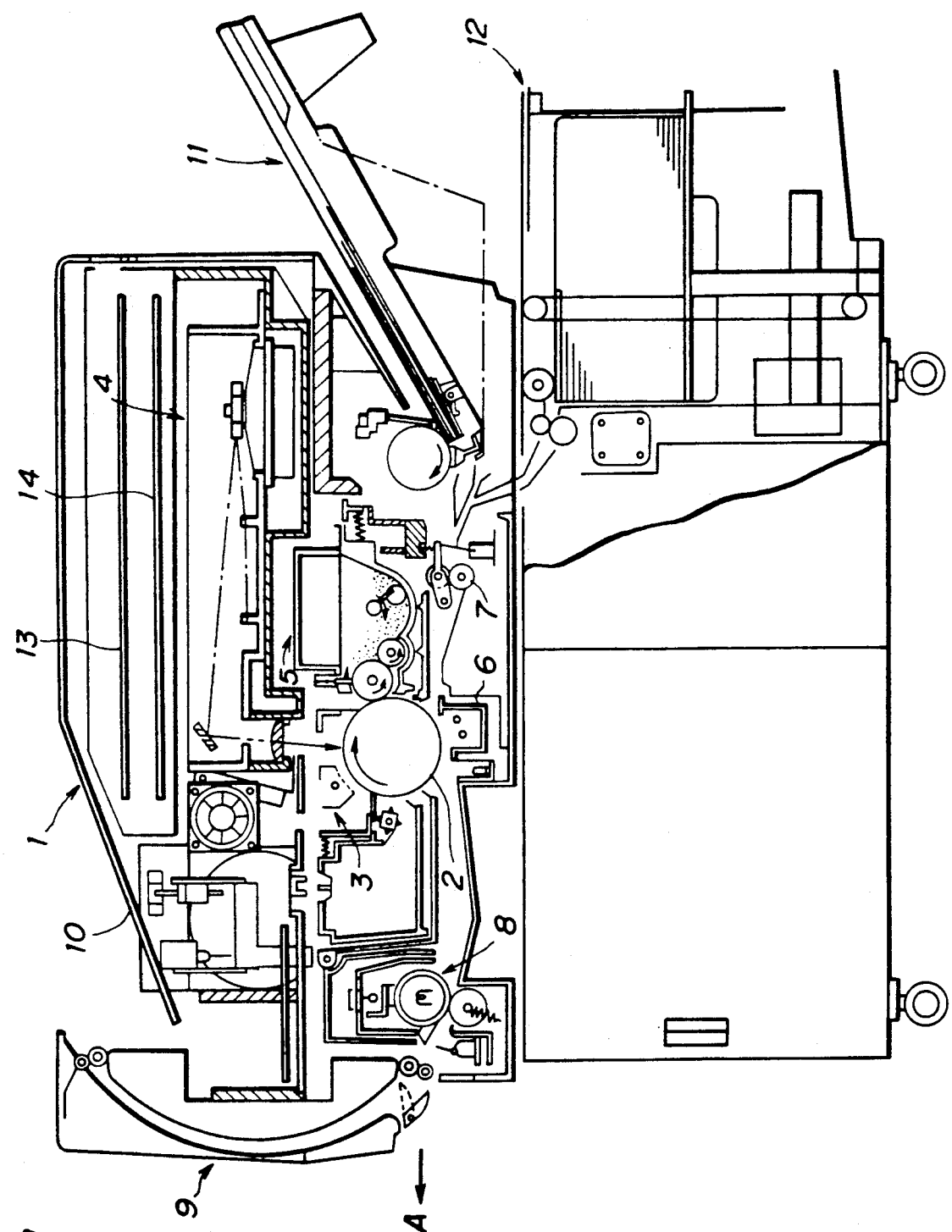
FIG. 1 is a side view in cross section generally showing an embodiment of an image forming apparatus according to the present invention.

FIG. 1 generally shows an embodiment of an image forming apparatus according to the present invention. In this embodiment, the present invention is applied to a laser beam printer.

A laser beam printer 1 shown in FIG. 1 is placed on top of an option paper supply unit 12 which is capable of supplying a large number of recording sheets.

When a print start button (not shown) is pushed, a photoconductive drum 2 is rotated in a direction of an arrow by a motor (not shown). A main charger 3 uniformly charges an outer peripheral surface of the photoconductive drum 2. A laser scan unit 4 scans the charged surface of the photoconductive drum 2 in a main scan direction by a laser beam which is turned ON/OFF depending on an image (video) signal. Hence, the surface of the photoconductive drum 2 is exposed by the laser beam and an electrostatic image is formed on the surface of the photoconductive drum 2.

A developing unit 5 adheres toner on regions of the electrostatic image where the charge is reduced or eliminated, so as to visualize the electrostatic image on the surface of the photoconductive drum 2 into a toner image. A transfer discharger 6 transfers this toner image onto a recording sheet which is transported from a resist roller pair 7 with a predetermined timing.

The recording sheet is separated from the photoconductive drum 2 and the toner image is fixed by a fixing unit 8 which subjects the recording sheet to heat and pressure. The recording sheet having the image formed thereon is ejected outside the laser beam printer 1 as indicated by an arrow A, or is ejected onto an eject tray 10 via an eject transport path 9.

The recording sheets are supplied one by one from a paper supply tray 11 or the paper supply unit 12. The recording sheet is once stopped at a position where the resist roller pair 7 pinch the tip end of the recording sheet, and is supplied to a transfer position when the resist roller pair 7 is thereafter driven with the predetermined timing. At the transfer position, the recording sheet is one the surface of the photoconductive drum 2 and confronts the transfer discharger 6.

A data controller 13 and a unit controller 14 which will be described later, are accommodated in a top portion of the laser beam printer 1. These controllers 13 and 14 control the overall operation of the laser beam printer 1.

Figure 2:
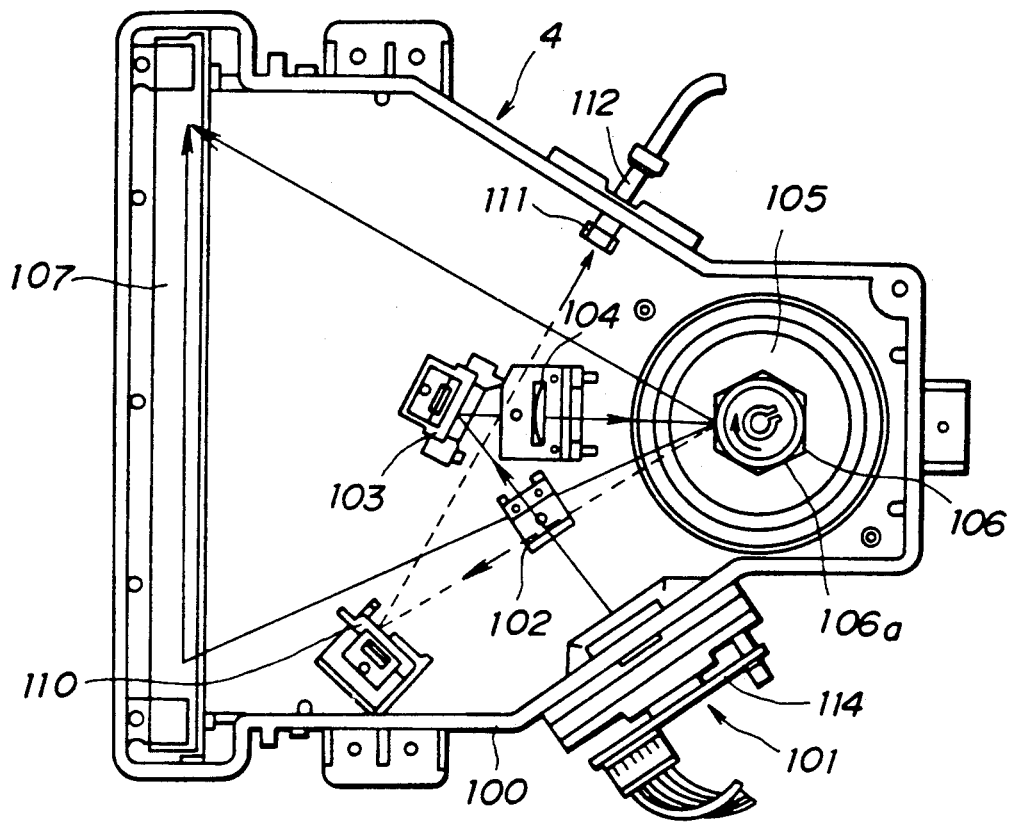
FIG. 2 is a plan view showing a laser scan unit shown in FIG. 1.
Figure 3:
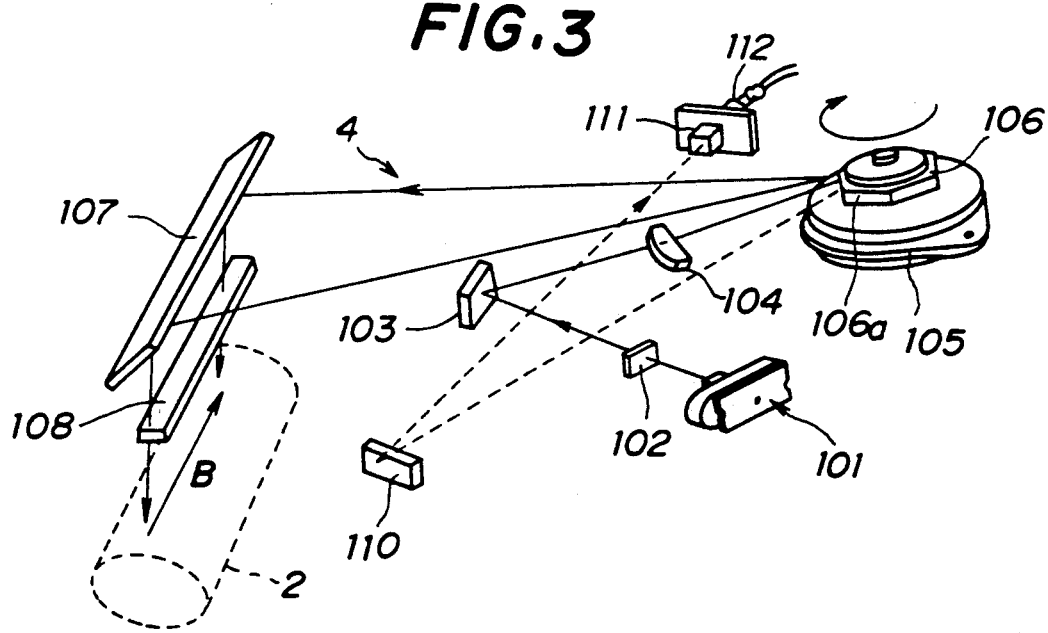
FIG. 3 is a perspective view showing an essential part of the laser scan unit.

FIGS. 2 and 3 respectively are a plan view and a perspective view of the laser scan unit 4 shown in FIG. 1. FIG. 3 only shows an essential part of the laser scan unit 4.

The laser scan unit 4 includes a casing 100 shown in FIG. 2, a laser diode unit 101 which is mounted on a side surface of the casing 100, a first cylindrical lens 102 which is mounted in a vicinity of a center of a bottom surface of the casing 100, a first mirror 103, a spherical lens 104, a motor 105 which is mounted at a rear portion on the bottom surface of the casing 100, a polygonal mirror 106 which is rotated in the direction of an arrow at a constant speed by the motor 105, a second mirror 107 which is mounted at a front end of the casing 100, a third mirror 110 which is mounted at a side portion on the bottom surface of the casing 100, and a synchronous detector 111 which is made up of a photosensor mounted on a side surface of the casing 100.

As will be described later, the laser diode unit 101 includes a laser diode, a collimator lens for converting the divergent light emitted from the laser diode into a parallel laser beam, an aperture member for shaping the laser beam into a shape which is long in the main scan direction and is short in the sub scan direction, and a printed circuit 114. The printed circuit 114 forms a part of an automatic output control circuit which controls an output of the laser diode.

The laser diode of the laser diode unit 101 integrally has a monitoring photodiode for receiving the laser beam which is emitted to the rear of the laser diode.

In addition, the first cylindrical lens 102 has a function of shaping the laser beam which is emitted from the laser diode unit 101 in the sub scan direction on the photoconductive drum 2 a indicated by a phantom line in FIG. 3.

The spherical lens 104 stops the laser beam which is reflected by the first mirror 103 and directs the laser beam with an upward inclination to a mirror surface 106a of the polygonal mirror 106 with an angle of diffraction of approximately 5.

Each mirror surface 106a of the polygonal mirror 106 is curved. In other words, an $f\theta$ lens which is conventionally provided between the second mirror 107 and the polygonal mirror 106 is not used, and a post object type deflector is formed. The post object type deflector is designed to deflect the light beam after forming the light beam into a convergent light.

The polygonal mirror 106 is rotated at the constant speed by the motor 105 and reflects the laser beam irradiated on the mirror surface 106a. Due to the rotation of the polygonal mirror 106, the angle formed by the mirror surface 106a with respect to the laser beam gradually increases. In this embodiment, the mirror surface 106a on which the laser beam is irradiated changes to the adjacent mirror surface 106a every time the polygonal mirror 106 rotates 360°/6. Hence, the laser beam irradiated on the polygonal mirror 106 swings repeatedly.

The second mirror 107 reflects the laser beam which is reflected by the polygonal mirror 106 and directs the laser beam towards the surface of the photoconductive drum 2 via the second cylindrical lens 108.

Because the polygonal mirror 106 rotates in the direction of the arrow, the laser beam scans the surface of the photoconductive drum 2 in a main scan direction B. One scan in the main scan direction B is made for every mirror surface 106a of the polygonal mirror 106. At the same time, the photoconductive drum 2 rotates in the sub scan direction which is perpendicular to the main scan direction B. The electrostatic image is formed on the surface of the photoconductive drum 2 by selectively discharging the uniformly charged surface of the photoconductive drum 2 in units of fine dots using the laser beam from the laser diode unit 101 which is turned ON/OFF depending on the video signal.

The third mirror 110 is arranged outside the scan region on the photoconductive drum 2 where the laser beam from the polygonal mirror 106 scans. This third mirror 110 receives the laser beam from the polygonal mirror 106 at times before before the laser beam actually scans the scan region on the photoconductive drum 2 and at times corresponding to boundaries of two successive mirror surfaces 106a. The third mirror 110 reflects the laser beam from the polygonal mirror 106 towards the synchronous detector 111.

A connection cable 112 connects the synchronous detector 111 to the unit controller 14 so as to supply an output beam detection signal of the synchronous detector 111 to the unit controller 14. Hence, it is possible to control the scan start timing of the laser beam and adjust the phase of the pixel clock signal as will be described later.

Figure 4:
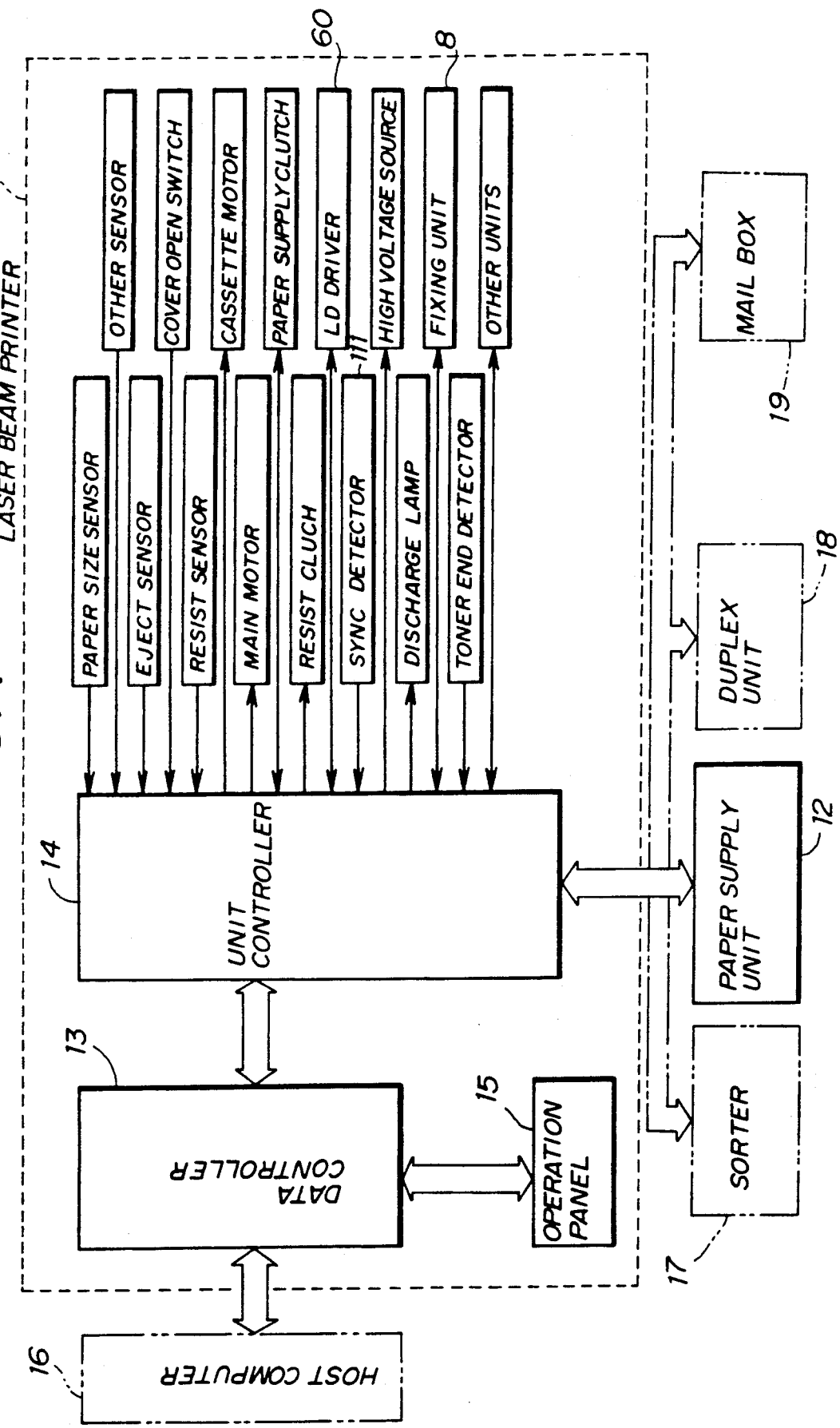
FIG. 4 is a system block diagram showing an embodiment of a control system of the laser beam printer shown in FIG. 1 together with peripheral parts.

FIG. 4 shows an embodiment of a control system of the laser beam printer 1 together with peripheral parts.

The control system of the laser beam printer 1 generally includes the data controller 13 and the unit controller 14.

The data controller 13 processes input information from an operation panel 15 and carries out a control operation such as controlling a display of a display device which is not shown in FIG. 4. In addition, the data controller 13 receives image data from a host computer 16 and transfers the image data to the unit controller 14 if needed. For example, the host computer 16 may be a word processing unit, a personal computer, an office computer, a data processor, a work station, an image editing processor and the like.

A laser diode driver 60 which will be described later and the synchronous detector 111 are coupled to the unit controller 14. Various other elements such as sensors, switches, motors, clutches are also coupled to the unit controller 14, but a description thereof will be omitted since these other elements are unrelated to the subject matter of the present invention.

The unit controller 14 refers to output detection signals of the various sensors and switches in order to execute a print cycle which is instructed by the data controller 13, and controls the operation sequences of various mechanical elements which form a printer engine o the laser beam printer 1 shown in FIG. 1 and the paper supply unit 12.

When option sorter 17, duplex unit 18, mail box 19 and the like are connected to the laser beam printer 1, the unit controller 14 also controls the operation sequences of these option units.

Figure 5:
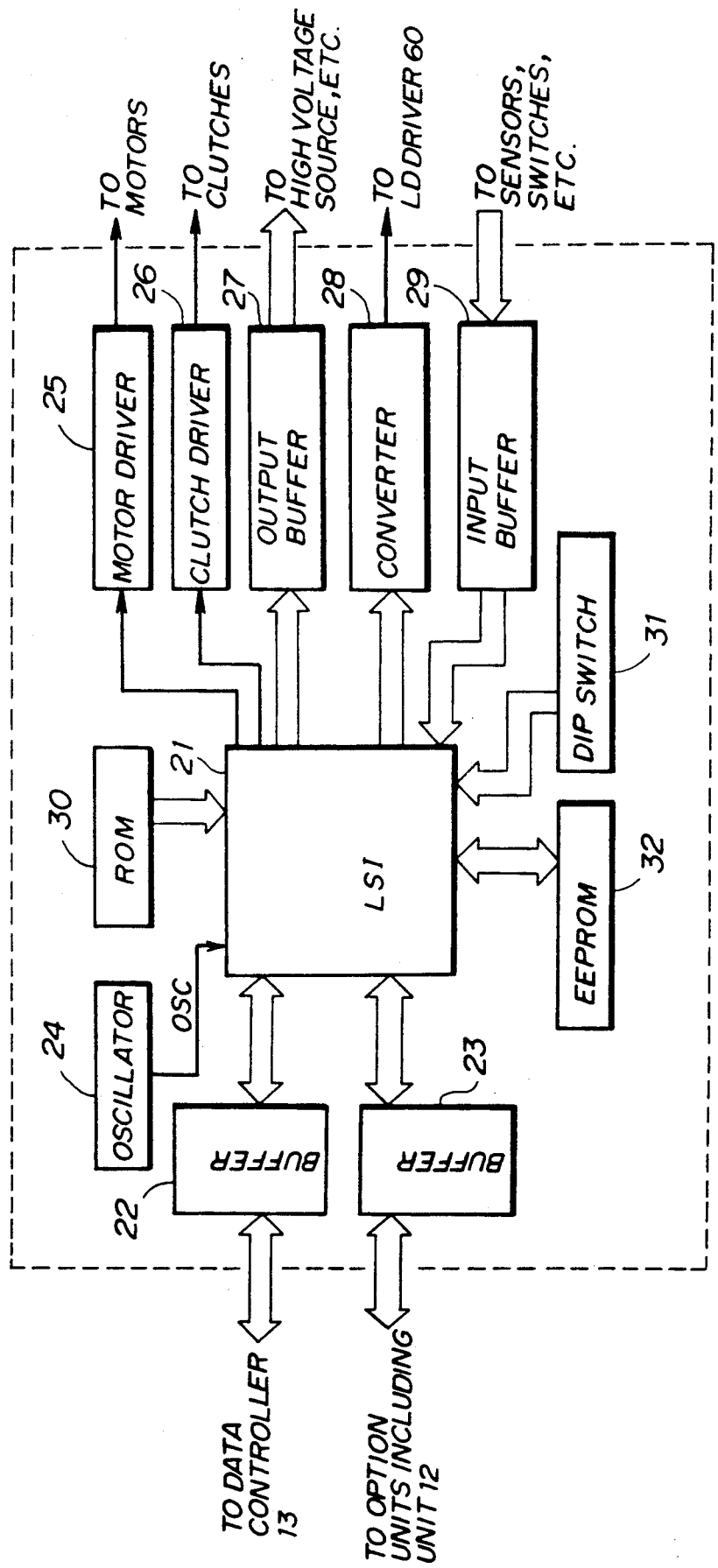
FIG. 5 shows an embodiment of a unit controller of the laser beam printer shown in FIG. 1.

FIG. 5 shows an embodiment of the unit controller 14. The unit controller 14 includes a large scale integrated circuit (LSI) 21. The LSI 21 is designed to control the elements which form the printer engine of the laser beam printer 1 with predetermined timings, so as to execute a print cycle in which an image having a predetermined size and tone is printed on the recording sheet.

Interface buffers 22 and 23 are connected to the LSI 21 s as to couple the LSI 21 to the data controller 13 and the option units such as the paper supply unit 12. A crystal oscillator 24 which generates a clock signal OSC having a constant frequency, a motor driver 25 which couples to the various motors, a clutch driver 26 which couples to the various clutches, an output buffer 27 which couples to the high voltage source and the like, a voltage-current converter circuit 28 which couples to the laser diode driver 60, and an input buffer 29 which couples to the various sensors and switches including the synchronous detector 111, are also connected to the LSI 21

Furthermore, a read only memory (ROM) 30, a dip switch 31 and an electrically erasable programmable ROM (EEPROM) 32 are connected to the LSI 21. The ROM 30 stores various data including correction data used for correcting the optical scan characteristic to adapt to various kinds of laser scan units. The dip switch 31 is used for specifying various data including the correction data corresponding to the laser scan unit which is used. The EEPROM is used for storing print condition data including the number of prints to be made which is instructed from the data controller 14.

Next, a description will be given of the operation of the dip switch 31 and the data which are stored in the ROM 30, by referring to FIGS. 6 and 7.

Figure 6:
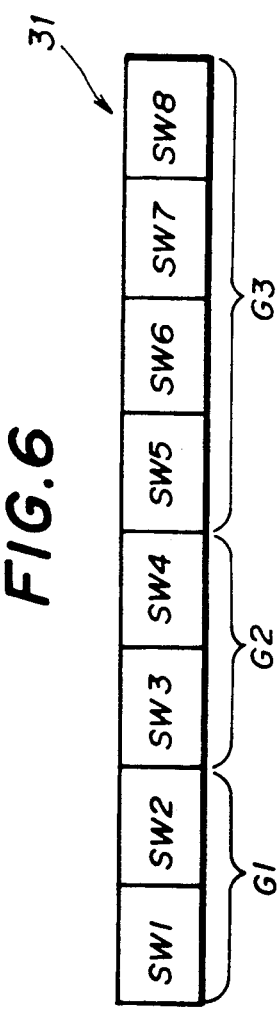
FIG. 6 shows an embodiment of a dip switch shown in FIG. 5.

As shown in FIG. 6, the dip switch 31 includes eight switches SW1 through SW8. A group G1 made up of the switches SW1 and SW2 is used for selecting the pixel density. A group G2 made up of the switches SW3 and SW4 is used for selecting the optical system. In addition, a group G3 made up of the switches SW5 through SW8 is used for adjusting the horizontal resist.

By a combination of ON/OFF (1/0) states of the switches SW1 through SW8 of the dip switch 31, it is possible to make the selections described in the following.

The pixel density is selected by setting the switches SW1 and SW2 of the group G1 as shown in the following Table 1.

TABLE 1

| SW1 | SW2 | Pixel Density (dpi) |
|---|---|---|
| 0 | 0 | 240 |
| 0 | 1 | 300 |
| 1 | 0 | 400 |
| 1 | 1 | 480 |

The optical system is selected by setting the switches SW3 and SW4 of the group G2 as shown in the following Table 2.

TABLE 2

| Case | SW3 | SW4 | Selected Optical System |
|---|---|---|---|
| (1) | 0 | 0 | Polygonal mirror with curved mirror surfaces |
| (2) | 0 | 1 | Rotary deflector & levelling lens |
| (3) | 1 | 0 | Galvano mirror |

TABLE 2-continued

| Case | SW3 | SW4 | Selected Optical System |
|---|---|---|---|
| (4) | 1 | 1 | Rotary deflector & fθ lens |

In Table 2, the rotary deflector may be a polygonal mirror or a hologram scanner.

The horizontal resist is selected by setting the switches SW5 through SW8 of the group G3 as shown in the following Table 3.

TABLE 3

| SW5 | SW6 | SW7 | SW8 | Number of Dots |
|---|---|---|---|---|
| 0 | 0 | 0 | 0 | −64 |
| 0 | 0 | 0 | 1 | −56 |
| 0 | 0 | 1 | 0 | −48 |
| 0 | 0 | 1 | 1 | −40 |
| 0 | 1 | 0 | 0 | −32 |
| 0 | 1 | 0 | 1 | −24 |
| 0 | 1 | 1 | 0 | −16 |
| 0 | 1 | 1 | 1 | −8 |
| 1 | 0 | 0 | 0 | ±0 |
| 1 | 0 | 0 | 1 | +8 |
| 1 | 0 | 1 | 0 | +16 |
| 1 | 0 | 1 | 1 | +24 |
| 1 | 1 | 0 | 0 | +32 |
| 1 | 1 | 0 | 1 | +40 |
| 1 | 1 | 1 | 0 | +48 |
| 1 | 1 | 1 | 1 | +56 |

In Table 3, the negative horizontal resist indicates that the printing of the image starts the number of dots to the left of the center value along the transport direction of the recording sheet, and the positive horizontal resist indicates that the printing of the image starts the number of dots to the right of the center value along the transport direction of the recording sheet.

In this embodiment, it is possible to select the optical system from four kinds of optical systems, and the pixel density can be selected to one of the four kinds of pixel densities for each optical system.

For this reason, the ROM 30 shown in FIG. 5 stores mutually different correction data for the four kinds of pixel densities with respect to each of the four kinds of optical systems as shown in FIGS. 7A, 7B, 7C and 7D which respectively correspond to the four cases (1), (2), (3) and (4) of Table 2. In FIGS. 7A through 7D, the illustration of the correction data for the pixel density of 480 dpi are omitted for the sake of convenience. In addition, it is assumed for the sake of convenience that the correction data includes main scan control data MSCD, light quantity modulation data LQMD and frequency modulation data FMD. The correction data is selected by the switches SW1 through SW4 of the dip switch 31.

Figure 8:
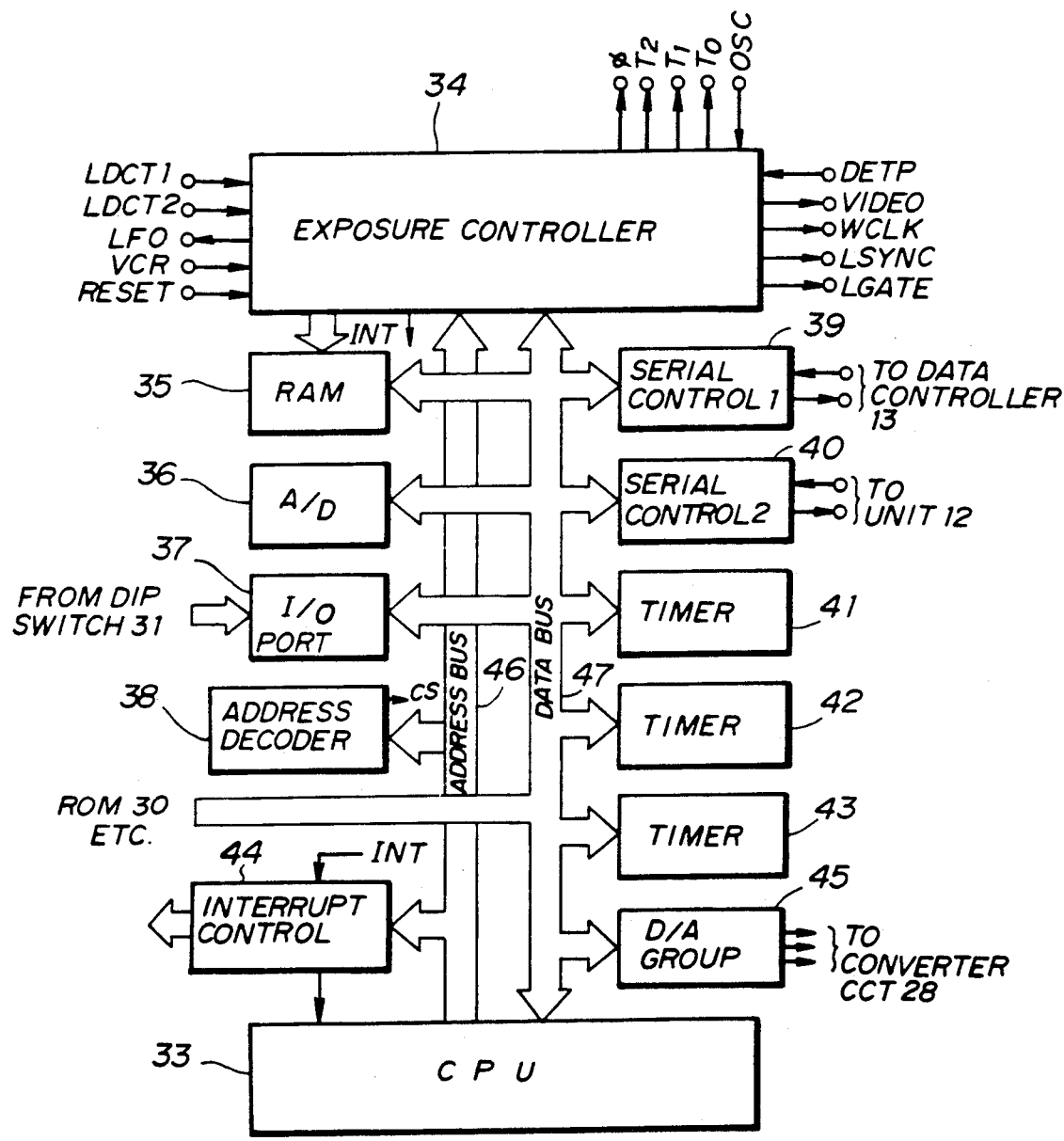
FIG. 8 is a system block diagram showing an embodiment of an LSI shown in FIG. 5.

FIG. 8 shows an embodiment of the internal structure of the LSI 21 of the unit controller 14 shown in FIG. 5.

The LSI 21 shown in FIG. 8 includes a central processing unit (CPU) 33, an exposure controller 34, a random access memory (RAM) 35, an analog-digital (A/D) converter 36, an input/output port 37, an address decoder 38, serial interface controllers 39 and 40, timers 41 through 43, an interrupt controller 44, and a digital-analog (D/A) converter group 45 which are coupled to each other via an address bus 46 and a data bus 47.

The CPU 33 inputs an 8-bit data from the dip switch 31 via the input/output port 37 immediately after the power source is turned ON, and reads the correction data which is specified by the 8-bit data from the ROM 30 shown in FIG. 5. The CPU 33 writes the read correction data into the RAM 35, and controls the sequence of the print cycle.

The CPU 33 also sets the test pattern into a register group which will be described later.

The exposure controller 34 operates responsive to the data which is read out from the ROM 30 by the CPU 33. For this reason, the CPU 33 writes the data read out from the ROM 30 into an internal register 50 of the exposure controller 34. The internal register 50 is shown in FIG. 9 and will be described later.

The exposure controller 34 generates a pixel clock signal WCLK based on the data which is stored in the internal register 50, and sets the reference light quantity for the laser diode. In addition, the exposure controller 34 generates a print start signal for the main scan direction based on the main scan control data MSCD (count data) which is read out from the RAM 35. The exposure controller 34 supplies a video signal VIDEO directly to the laser diode driver 60 shown in FIG. 4, and also supplies the light quantity control data which is derived from the light quantity modulation data LQMD read out from the RAM 35 to the laser diode driver 60 via the D/A converter group 45 shown in FIG. 8 and the voltage-current converter circuit 28 shown in FIG. 5, so as to control the light emitting timing and the light emitting power of the laser diode.

Figure 9:
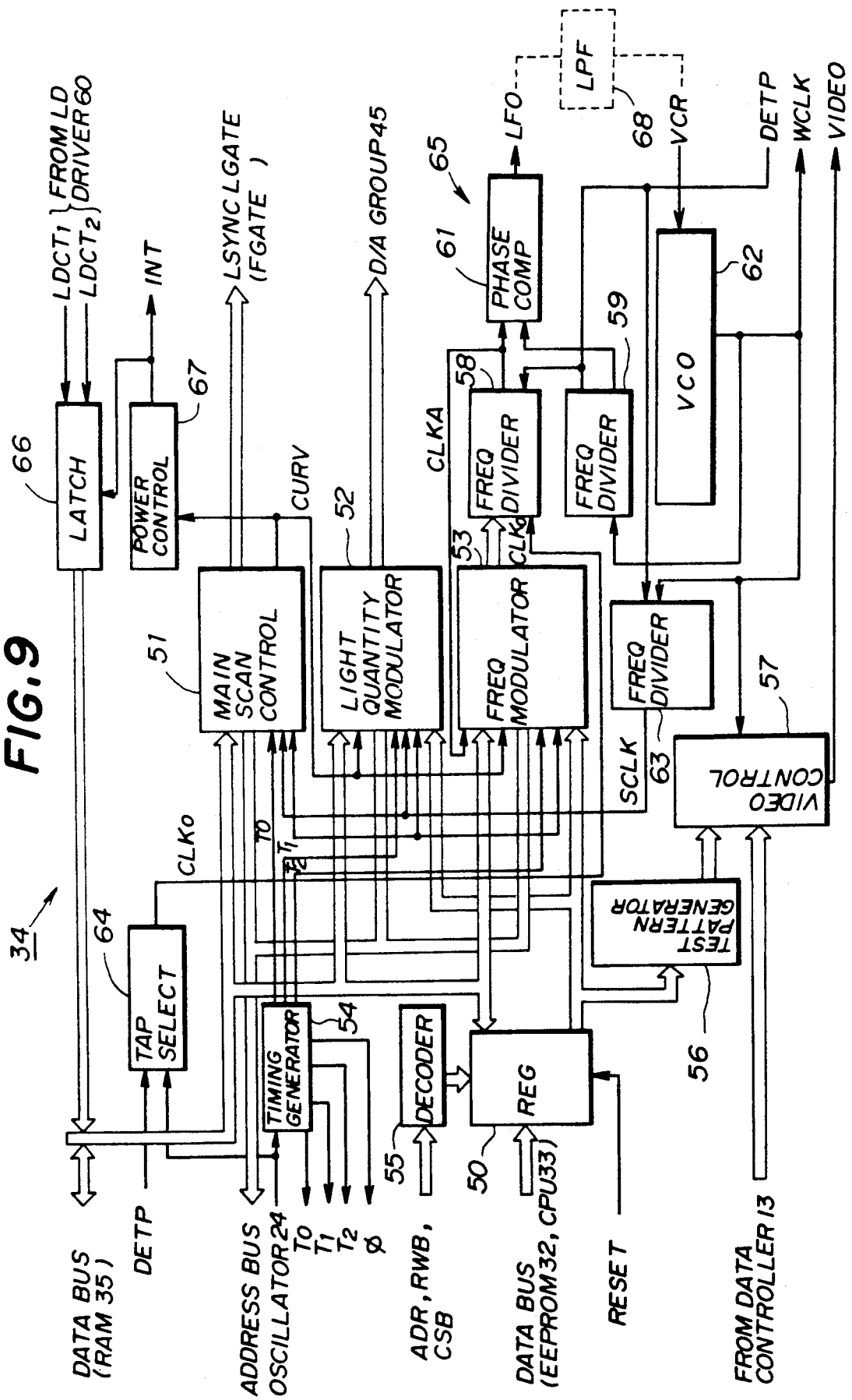
FIG. 9 is a system block diagram showing an embodiment of an exposure controller shown in FIG. 8.
Figures 12A, 12B, 12C, 12D:
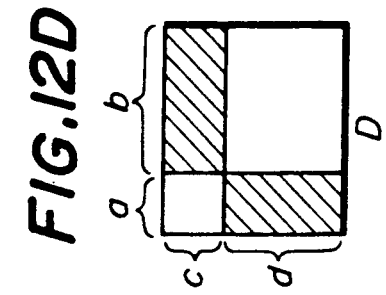
FIGS. 12A through 12D are diagrams for explaining kinds of patterns which can be generated by the test pattern generator shown in FIG. 11.

FIG. 9 shows an embodiment of the internal structure of the exposure controller 34 shown in FIG. 8.

In the exposure controller 34 shown in FIG. 9, a main scan controller 51 generates various timing signals based on the main scan control data MSCD read out from the RAM 35, including timing signals CURV, LSYNC and LGATE.

The timing signal CURV is a modulation start signal which becomes active during a scan time of a modulation region of the pixel clock frequency and a modulation region of the light emitting power, that is, the light quantity of the laser diode. Responsive to this timing signal CURV, a power controller 67 supplies an interrupt signal INT to the interrupt controller 44 shown in FIG. 8. In addition, a latch circuit 66 latches binary signals LDCT1 and LDCT2 which are output from the laser diode driver 60 in response to the interrupt signal INT. The binary signals LDCT1 and LDCT2 will be described later.

In addition, the timing signal LSYNC is used for synchronizing the timing with which the video signal is transmitted to the print data processing part. The timing signal LGATE is used for restricting the scan time of the print region in the main scan direction.

A light quantity modulator 52 outputs light quantity control data to the D/A converter group 45 shown in FIG. 8 based on the light quantity modulation data LQMD read out from the RAM 35, so as to vary the light emitting quantity of the laser diode.

A frequency modulator 53 generates a PLL reference signal CLKA which has a frequency set in the internal register 50 by the CPU 33. In addition, the frequency modulator 53 modulates the PLL reference signal CLKA based on the frequency modulation data FMD read out from the RAM 35.

A decoder 55 decodes the address when writing data in the internal register 50. Hence, the CPU 33 writes into the internal register 50 data such as upper limit data and lower limit data for the light quantity of the laser diode, reference frequency data of the PLL reference signal CLKA and test pattern data.

A test pattern generator 56 generates a test pattern based on the data which is written in the internal register 50 by the CPU 33. This test pattern is made up of data related to time intervals in which the video data of the repetition pattern is generated in the main and sub scan directions. Details of the test pattern will be described later.

A video controller 57 modulates the test pattern from the test pattern generator 56, the image data from the data controller 13 and the like based on the output of the main scan controller 51 and generates the video signal VIDEO.

A timing generator 54 generates timing signals $\phi$, $T_0$, $T_1$ and $T_2$ which are respectively shown in FIG. 10(A), (B), (C) and (D) based on the clock signal OSC which is output from the oscillator 24.

The timing signal $\phi$ determines the timing with which the exposure controller 34 makes access to the RAM 35. On the other hand, the timing signals $T_0$, $T_1$ and $T_2$ respectively determine the timings with which the main scan control data MSCD, the light quantity modulation data LQMD and the frequency modulation data FMD are read out from the RAM 35 as shown in FIG. 10(E).

Figure 10:
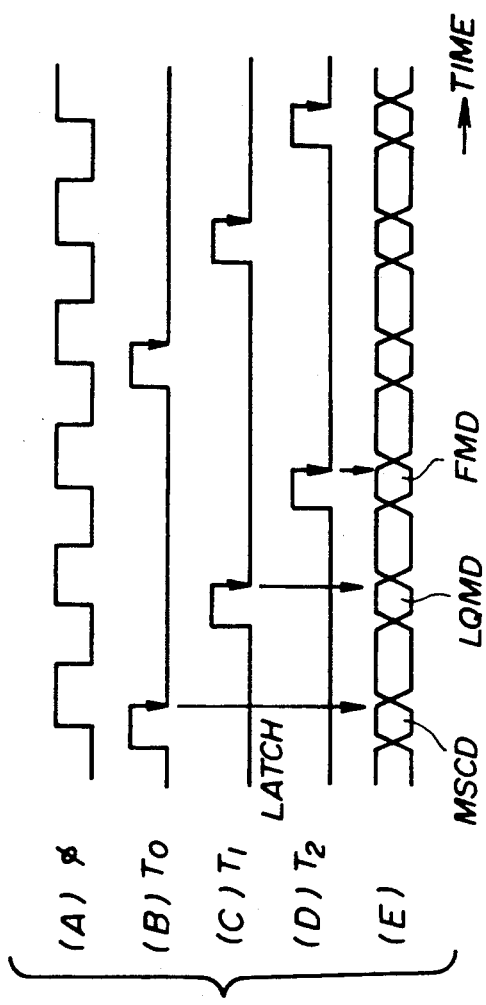
FIG. 10 is a timing chart for explaining a read operation of a RAM shown in FIG. 8.
Figure 7A:
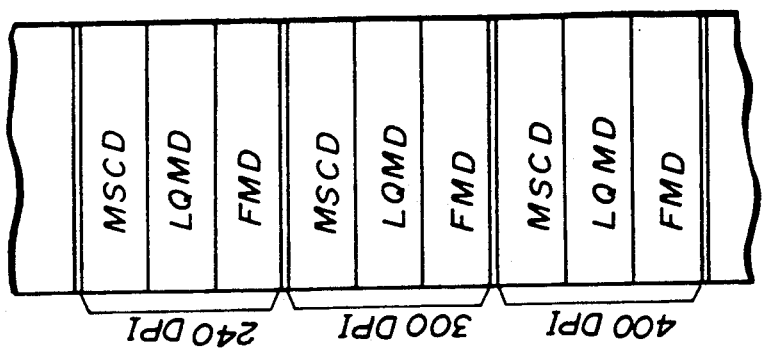
FIGS. 7A through 7D respectively show correction data stored in a ROM shown in FIG. 5.
Figure 7B:
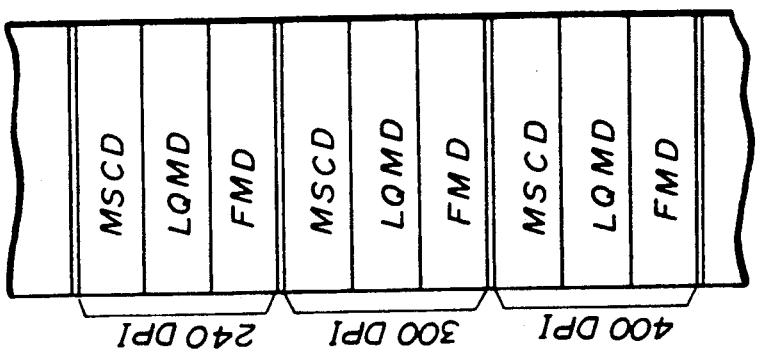
Figure 7C:
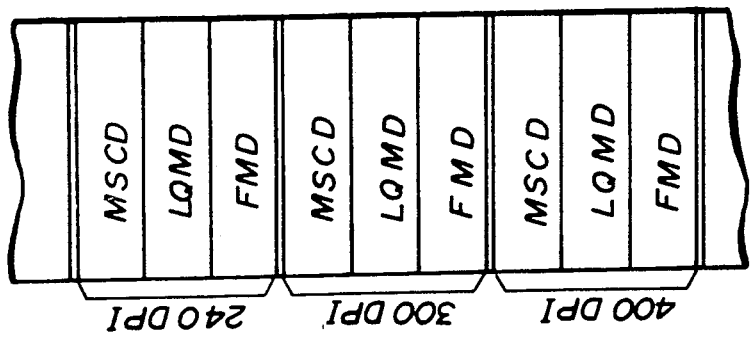
Figure 7D:
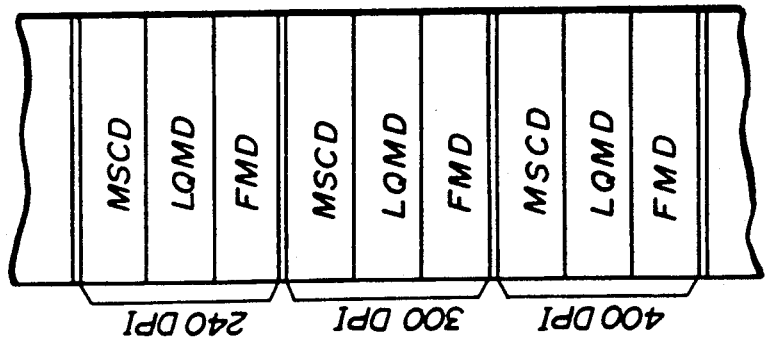

In other words, as shown in FIG. 10, the main scan control data MSCD is read out from the RAM 35 at the rising edge of the timing signal $T_0$, the light quantity modulation data LQMD is read out from the RAM 35 at the falling edge of the timing signal $T_1$, and the frequency modulation data FMD is read out from the RAM 35 at the falling edge of the timing signal $T_2$.

As may be seen from FIG. 10, the timing signals $T_0$, $T_1$ and $T_2$ are respectively obtained by frequency-dividing the timing signal $\phi$ by three, and the timing signals $T_0$, $T_1$ and $T_2$ have a phase difference amounting to one period of the timing signal $\phi$.

A tap selector 64 has delay circuits connected in a plurality of stages. The tap selector 64 generates a plurality of clock signals having phases which are mutually and successively shifted by the same amount in response to the clock signal OSC. Out of these clock signals, the tap selector 64 selects one clock signal which is most synchronized to the falling edge of a beam detection signal DETP which is output from the synchronous detector 111 shown in FIG. 4 and generates a reference clock signal $CLK_0$. This reference clock signal $CLK_0$ is supplied to a frequency divider 58.

The frequency dividers 58 and 59, a phase comparator 61, a voltage controlled oscillator (VCO) 62, and an external lowpass filter 68 form a phase locked loop (PLL) circuit 65. This PLL circuit 65 is reset by the beam detection signal DETP, and generates a pixel clock signal WCLK which has a predetermined frequency. This predetermined frequency is obtained by multiplying the PLL reference signal CLKA which is output from the frequency divider 58 by the frequency which is specified by the frequency modulator 53.

A frequency divider 63 frequency-divides the pixel clock signal WCLK and generates a main scan control clock SCLK.

Next, a description will be given of the generation of the test pattern.

Figure 11:
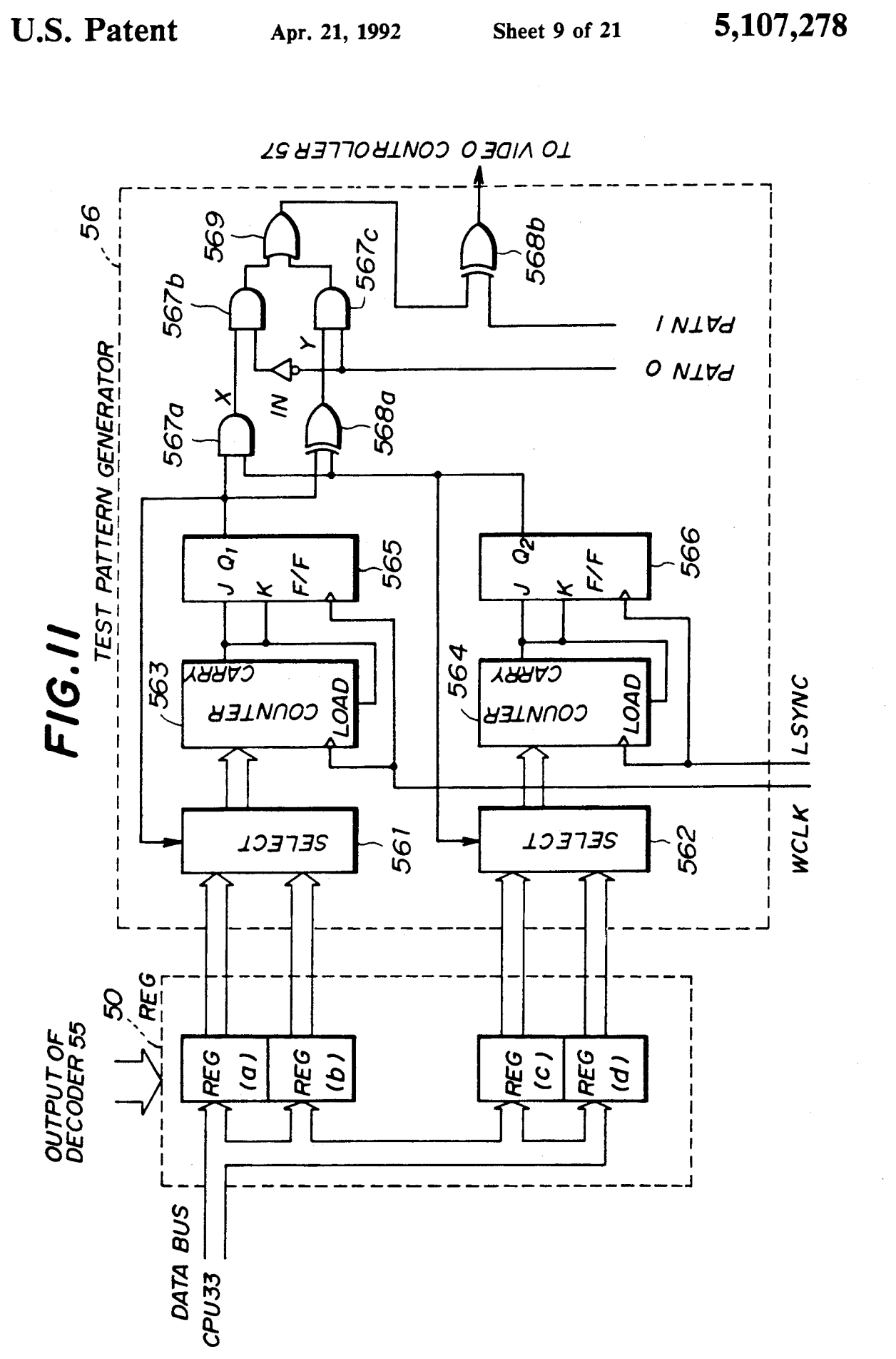

FIG. 11 shows an embodiment of the test pattern generator 56 together with four registers (a), (b), (c) and (d) which form a register group within the internal register 55 shown in FIG. 9.

The test pattern generator 56 includes two selectors 561 and 562, a main counter 563, a sub counter 564, two flip-flop circuits 565 and 566, three AND circuits 567a and 568b, an OR circuit 569 and an inverter circuit IN.

Four kinds of patterns A through D respectively shown in FIGS. 12A through 12D can be generated by the pattern generator 56. In FIGS. 12A through 12D, a region which is printed in black is indicated by a hatching, and in this embodiment, the hatched region corresponds to a region in which the laser diode is turned ON.

One of the patterns A through D is selected by the CPU 33 shown in FIG. 8, and a test pattern generation mode is set so that it becomes possible to print the selected pattern continuously.

Figure 13:
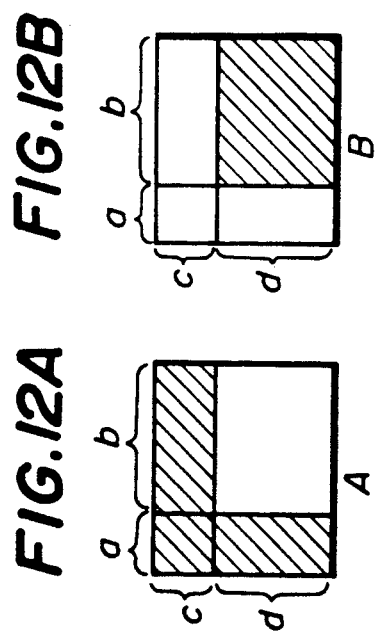
FIG. 13 is a diagram showing a repetition of the pattern shown in FIG. 12A which is generated as a test pattern.

A description will be given of a case where the pattern A is selected and printed by referring to FIG. 13.

Lengths a, b, c and d in each of the patterns A through D are set in the internal register 50 by the CPU 33 from the ROM 30 shown in FIG. 5. That is, the CPU 33 writes the data describing the lengths a through d shown in FIG. 13 of the patterns A through D into the four registers (a) through (d) which are selected by the decoder 55 via the data bus 47.

After the data describing the lengths a through d are written in the registers (a) through (d) of the internal register 50, the test pattern generator 56 operates as follows. That is, the selector 561 shown in FIG. 11 selects the output data of the register (a) or (b) in response to an output $Q_1$ of the flip-flop circuit 565. Hence, the selector 561 selectively outputs the output data of the register (b) when the output $Q_1$ of the flip-flop circuit 565 has a low level, and selectively outputs the output data of the register (a) when the output $Q_1$ of the flip-flop circuit 565 has a high level. The output data of the selector 565 is set in the main counter 563. Similarly, the selector 562 selectively outputs the output data of the register (d) or (c) depending on the level of an output $Q_2$ of the flip-flop circuit 566. The output data of the selector 562 is set in the sub counter 564.

Figures 14, 15:
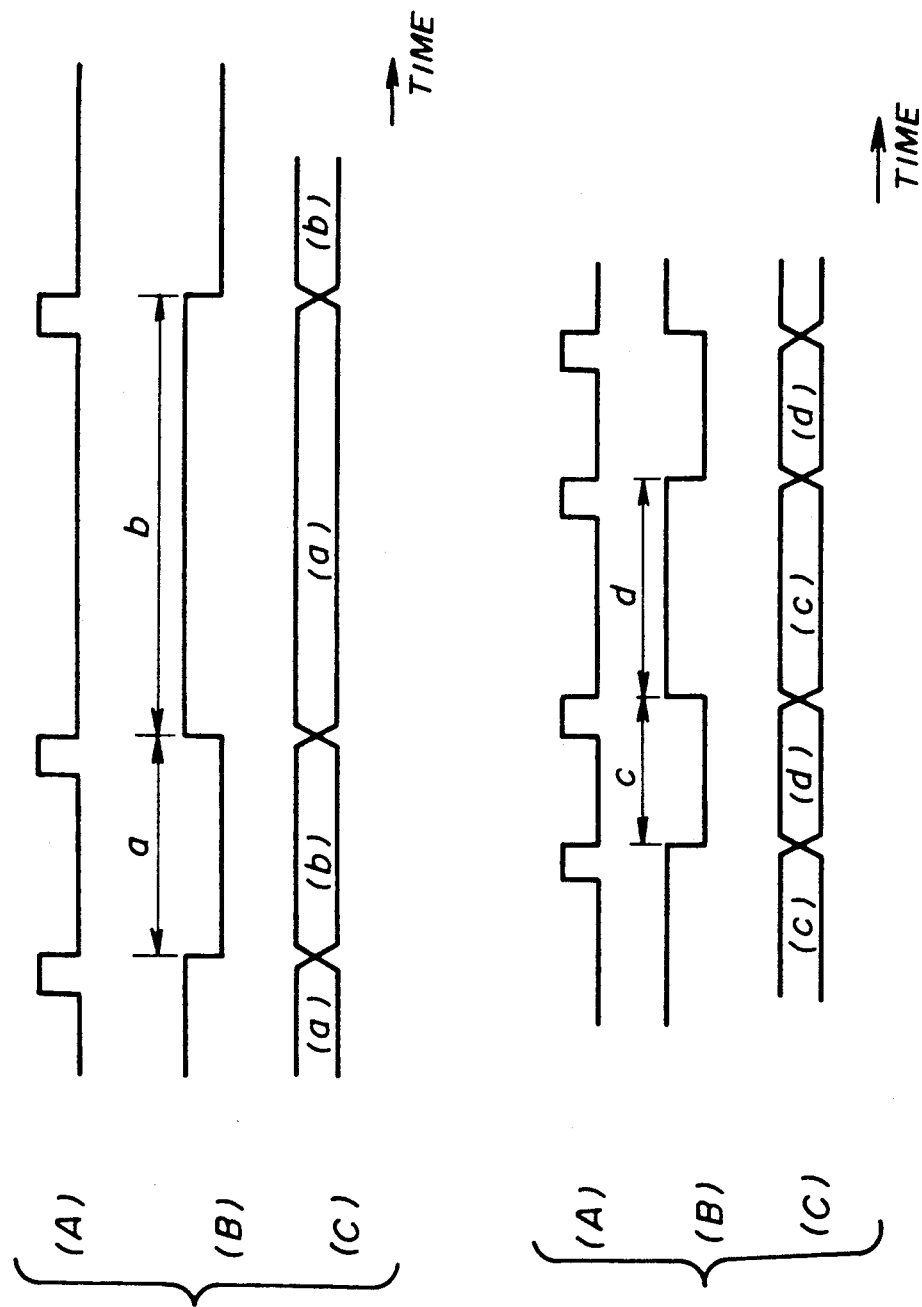
FIG. 14 is a timing chart for explaining an operation timing of a main counter shown in FIG. 11.
FIG. 15 is a timing chart for explaining an operation timing of a sub counter shown in FIG. 11.

FIGS. 14 and 15 respectively show operation timings of the selectors 561 and 562. FIG. 14(A) shows a carry output of the main counter 563, FIG. 14(B) shows the output $Q_1$ of the flip-flop 565, and FIG. 14(C) shows the output data of the selector 561. On the other hand, FIG. 15(A) shows a carry output of the sub counter 564, FIG. 15(B) shows the output $Q_2$ of the flip-flop 566, and FIG. 15(C) shows the output data of the selector 562.

The main counter 563 uses the output data of the selector 561 as the preset data and counts the pixel clock signal WCLK. When the main counter 563 counts up and outputs the carry output, the main counter 563 loads the preset data from the selector 561 responsive to the carry output. In addition, the main counter 563 changes the state of the flip-flop 565 in response to the rising edge of the next pixel clock signal WCLK. Accordingly, the output data of the selector 561 changes from the output data of the register (b) to the output data of the register (a) in response to the transition of the output $Q_1$ of the flip-flop circuit 565.

By repeating the above described operation, the flip-flop 565 outputs a signal which has a pulse width b and a period a+b which are specified by the output data of the registers (a) and (b).

Similarly, in the circuit part including the selector 562, the sub counter 564 and the flip-flop circuit 566, the sub counter 564 counts the timing signal LSYNC and the flip-flop 566 outputs a signal having a pulse width d and a period c+d which are specified by the output data of the registers (c) and (d).

Figure 16:
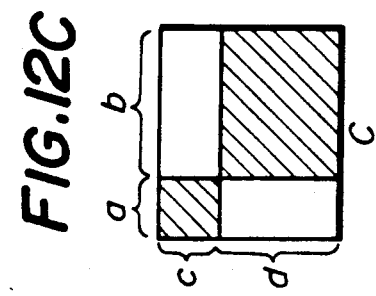
FIG. 16 is a truth table for explaining the operation of the test pattern generator.

FIG. 16 shows a truth table which is obtained for outputs X and Y for the output $Q_1$ of the flip-flop 565 and the output $Q_2$ of the flip-flop 566, where the output X is obtained from the AND circuit 567a and the output Y is obtained from the exclusive-OR circuit 568a.

Figure 17:
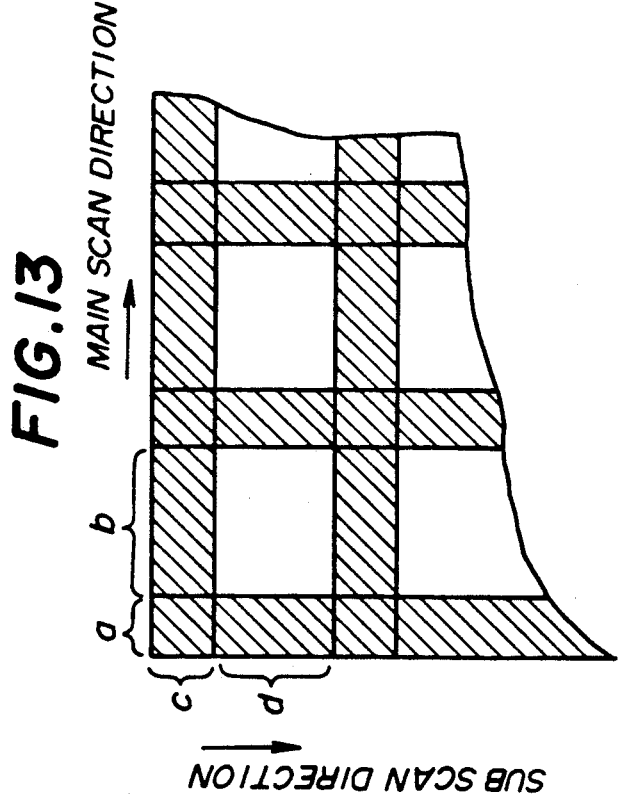
FIG. 17 shows values of signals PATN0 and PATN1 which determine the pattern which is generated by the test pattern generator.

A signal PATN0 is supplied to the inverter circuit IN and the AND circuit 567c. On the other hand, a signal PATN1 is supplied to the exclusive-OR circuit 568b. Hence, a signal which determines the time intervals in which the video data of the repetition pattern is generated in the main and sub scan directions is output from the exclusive-OR circuit 568b as the output signal of the test patter generator 56 and supplied to the video controller 57 shown in FIG. 9. The video controller 57 generates the video signal VIDEO based on the output signal of the test pattern generator 56, and it is therefore possible to realize the patterns A through D. FIG. 17 shows the patterns A through D which are determined by the values of the signals PATN and PATN1.

In this embodiment, when the registers (a) through (d) respectively have an 8-bit structure, a and b can be set in a range of 0 to 255 dots and c and d can be set in a range of 0 to 255 lines.

Next, a description will be given of the main scan controller 51 shown in FIG. 9.

The main scan control data MSCD is used as basic data for generating the timing signals which are required to carry out the main scan described above. The timing signals include the time signal (main scan synchronizing signal) LSYNC in the main scan direction (direction B shown in FIG. 3) starting from the beam detection signal DETP which is output from the synchronous detector 111 shown in FIGS. and 3, the timing signal (main scan image region specifying signal) LGATE, the timing signals PCDA, CURV, SYNC1, SYNC2 and the like. The main scan control data MSCD is described by counted values (DS1, DS2, DS3, . . . ) which are obtained by counting the main scan control clock SCLK during intervals in which the adjacent timing signals switch timesequentially.

Figure 18:
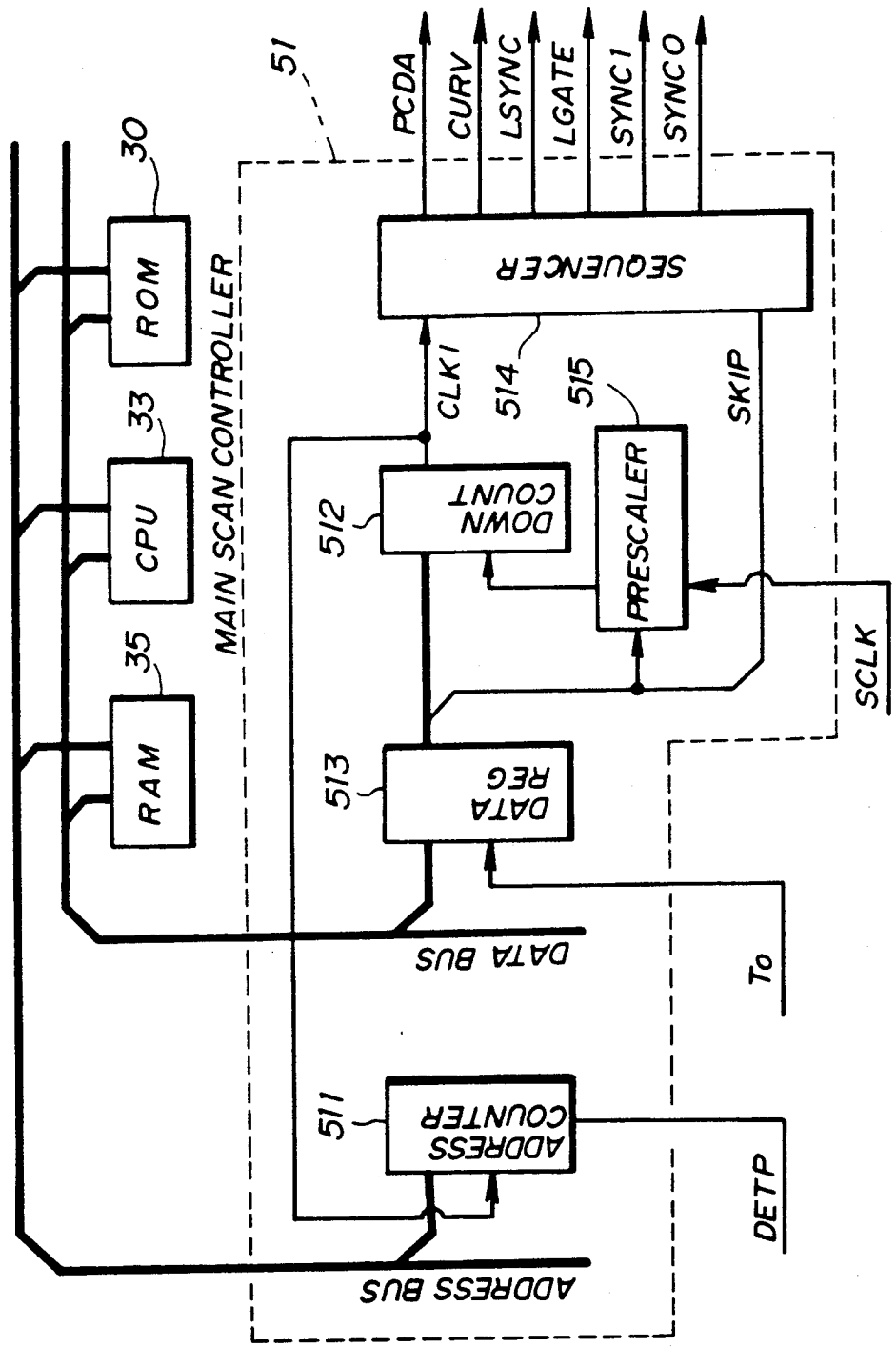
FIG. 18 is a system block diagram showing an embodiment of a main scan controller shown in FIG. 9.

As shown in FIG. 18, the main scan controller 51 includes an address counter 511, a down counter 512, a data register 513, a sequencer 514 and a prescaler 515. The CPU 33 and the RAM 35 shown in FIG. 8 and the ROM 30 shown in FIG. 5 are connected to the main scan controller 51 as shown in FIG. 18.

During an initializing operation which is started when the power source is turned ON, the CPU 33 selects one of the data groups stored in the ROM 30 and transfers the selected data group to the RAM 35 based on the state of the dip switch 31, the contents of the ROM 30, an instruction signal from another block or the like, and also depending on the kind of resolution (pixel density) of the optical system of the laser scan unit 4 which is used, the printing speed, the print region or the like.

Figure 19:
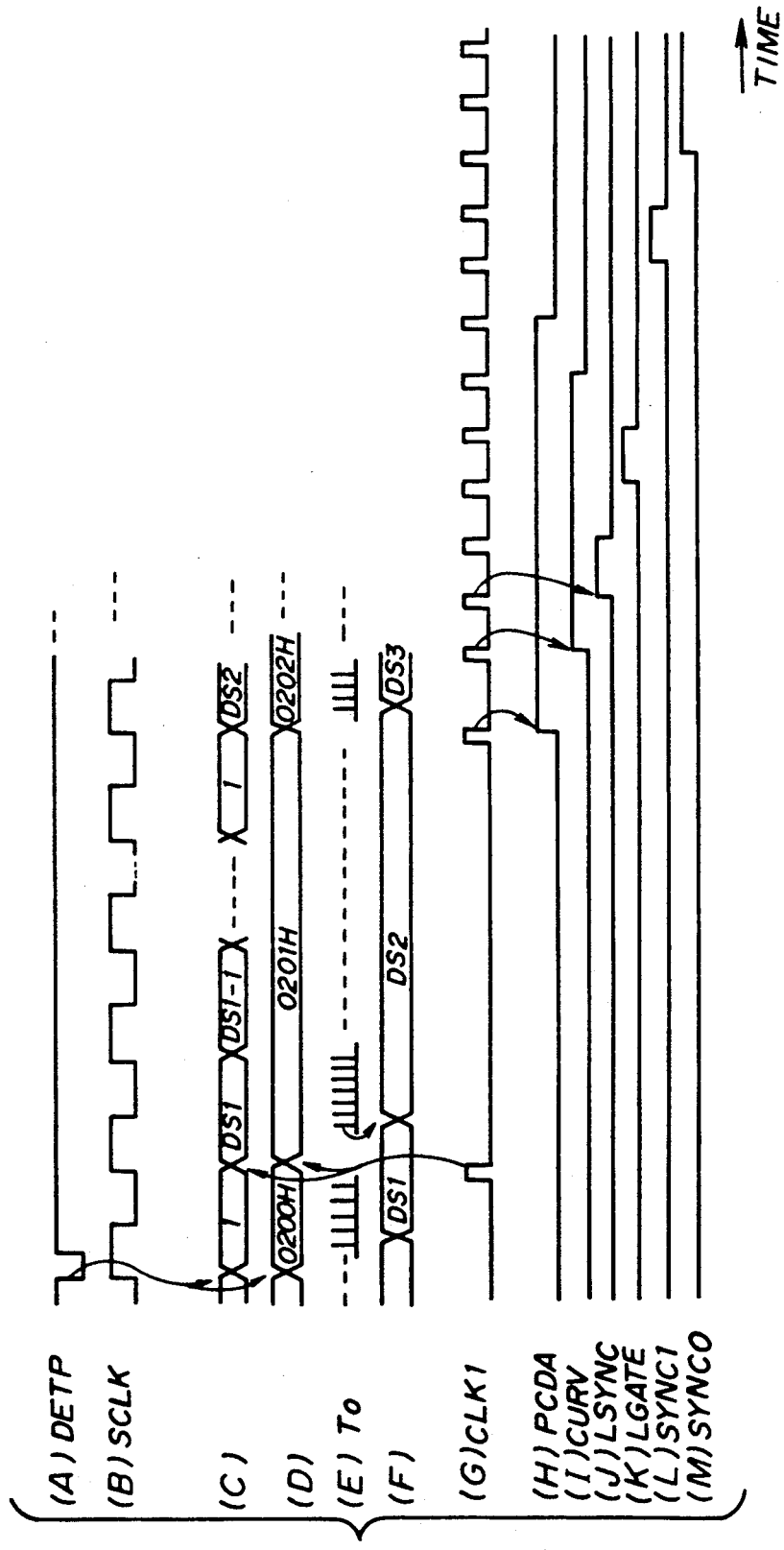
FIG. 19 is a timing chart for explaining an operation of the main scan controller shown in FIG. 18.

FIG. 19 is a timing chart for explaining the operation of the main scan controller 51 shown in FIG. 18. FIG. 19(A) shows the beam detection signal DEPT, FIG. 19(B) shows the main scan control clock SCLK, FIG. 19(C) shows an output of the down counter 511, FIG. 19(D) shows an output of the address counter 512, FIG. 19(E) shows an output of the data register 513, and FIG. 19(G) shows a clock signal CLK1. In addition, FIG.19(H) through (M) respectively show the timing signals PCDA, CURV, LSYNC, LGATE, SYNC1 and SYNC0.

As shown in FIG. 19, the data DS1 which is the first content of the main scan control data MSCD read out from the RAM 35 is set in the data register 513 responsive to the timing signal $T_0$ immediately after the falling edge of the beam detection signal DEPT. The data DS1 is then loaded into the down counter 512.

The main scan control data MSCD is made up of one byte as shown in FIG. 20. The bit numbers "6" through "0" of the main scan control data MSCD are loaded into the down counter 512 as an initial value and a down count is made from this initial value. The bit number "7" of the main scan control data MSCD indicates the existence of a skip, and is latched in the prescaler 515 and the sequencer 514 together with other bits simultaneously.

When the bit number "7" of the main scan control data MSCD latched in the prescaler 515 has a value "1", the prescaler 515 prescales the main scan control clock SCLK. In this embodiment, the main scan control clock SCLK is frequency divided by 128.

When the bit number "7" of the main scan control data MSCD has a value "0", the down counter 512 down counts the value which is indicated by the bit numbers "6" through "0" by the main scan control clock SCLK itself and generates the clock signal CLK1. But when the bit number "7" of the main scan control data MSCD has the value "1", the down counter 512 generates the clock signal CLK1 by down counting the value indicated by the bit numbers "6" through "0" by a clock which is obtained by frequency-dividing the main scan control clock SCLK by 128.

The bit number "7" of the main scan control data MSCD which is latched in the sequencer 514 instructs the sequencer 514 to neglect the next incoming clock signal CLK1. Hence, even when the varying intervals of the signals which are generated by the sequencer 514 as will be described later amount to 128 or more main scan control clocks SCLK, it is possible to describe such signals by using the data which has the bit number "7" having the value "1".

The down counter 512 generates the clock signal CLK1 when the down count underflows, and increments the address value of the address counter 511. In this case, the down counter 512 also renews the address value supplied to the RAM 35. In other words, the the address for making access to the data DS1 of the RAM 35 is incremented by one.

A data DS2 which is read out from the next address of the RAM 35 in synchronism with the timing signal $R_0$ is set in the data register 513 and then loaded into the down counter 512. The down counter 512 makes the down count from the loaded value in response to the main scan control clock SCLK.

Thereafter, the down counter 512 generates the clock signal CLK1 when the down count underflows again. In this case, the down counter 512 increments the address value of the address counter 511 and renews the address value of the RAM 35. In other words, the address for making access to the data DS2 of the RAM 35 is incremented by one.

A data DS3 which is read out from the next address of the RAM 35 in synchronism with the timing signal $T_0$ is set in the data register 513 and then loaded into the down counter 512. The down counter 512 makes the down count from the loaded value in response to the main scan control clock SCLK.

Similarly thereafter, the down counter 512 generates the clock signal CLK1, and the sequencer 515 counts the clock signal CLK1 and generates the timing signals PCDA, CURV, LSYNC, LGATE, SYNC1 and SYNC0.

According to the main scan controller 51, the timings of the various timing signals can be varied by varying the main scan control data MSCD (count data of the varying timing) which is stored in the RAM 35.

Out of the timing signals generated from the main scan controller 51, the timing signal CURV, for example, is supplied to the light quantity modulator 52 and the frequency modulator 53 shown in FIG. 9.

Even when the varying interval of each timing signal generated by the sequencer 514 amounts to 128 or more main scan control clocks SCLK, it is possible to generate such a timing signal by setting the bit number "7" of the main scan control data MSCD to "1". This will now be described for a case where the CPU 33 transfers the main scan control data MSCD to an address "1000" and following addresses of the RAM 35, by referring to a timing chart of FIG. 22.

First, the bit number "7" of the main scan control data MSCD which is stored at the address "1000" of the RAM 35 is "0". Hence, the sequencer 14 generates the timing signal PCDA shown in FIG. 22(C) which rises after two main scan control clocks SCLK shown in FIG. 22(B) from the rising edge of the beam detection signal DETP shown in FIG. 22(A) depending on the value of the bit numbers "6" through "0".

Similarly, because the bit number "7" of the main scan control data MSCD which is stored at the address "1001" of the RAM 35 is also "0", the sequencer 514 generates the timing signal CURV shown in FIG. 22(D) which rises after one main scan control clock SCLK from the rising edge of the timing signal PCDA depending on the value of the bit numbers "6" through "0".

Next, since the bit number "7" of the main scan control data MSCD which is stored at the address "1002" of the RAM 35 is "1", only the address counter 511 is incremented after 128×1 main scan control clocks SCLK from the rising edge of the timing signal CURV depending on the value of the bit numbers "6" through "0", and the timing signal LSYNC which is generated from the sequencer 514 does not change as shown in FIG. 22(E).

The bit number "7" of the main scan control data MSCD which is stored at the address "1003" of the RAM 35 is "1". Hence, the timing signal LSYNC rises 3 main scan control clocks SCLK thereafter, that is, 128×1+3=131 main scan control clocks SCLK after the rising edge of the timing signal CURV.

Figure 23:
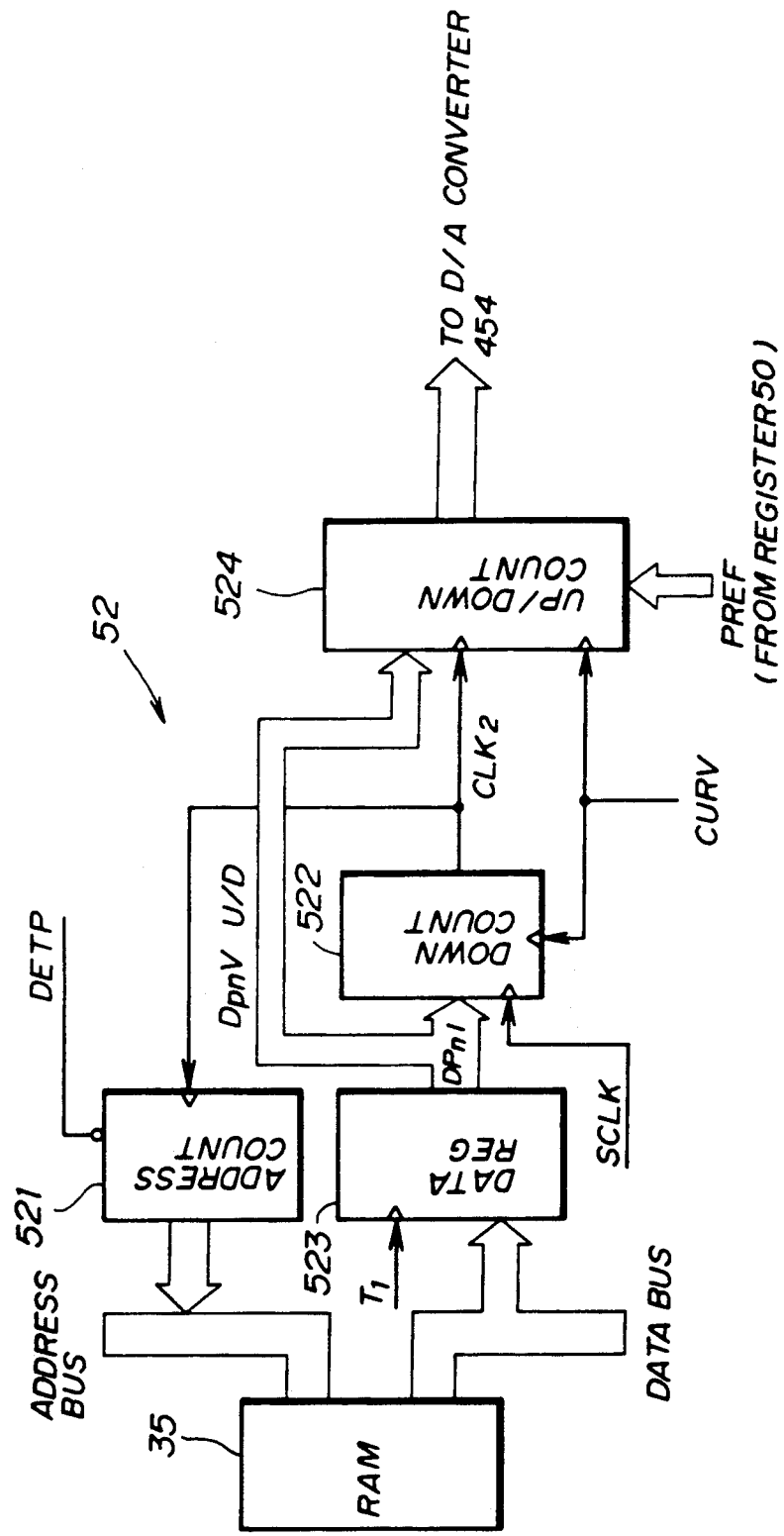
FIG. 23 is a system block diagram showing an embodiment of a light quantity modulator shown in FIG. 9.

Next, a more detailed description will be given of the light quantity modulator 52 shown in FIG. 9, by referring to FIG. 23. FIG. 23 shows an embodiment of the light quantity modulator 52.

The light quantity modulation data LQMD is used to vary the light emitting quantity of the laser diode based on the upper limit data for the light quantity of the laser diode which is written into the internal register 50 of the exposure controller 34 shown in FIG. 9 by the CPU 33 shown in FIG. 8.

FIG. 24 shows a data format of the light quantity modulation data LQMD. A varying quantity DPn with which the light emitting quantity of the laser diode is varied is described by the bit numbers "5" and "6" of the light quantity modulation data LQMD. A varying direction U/D in which the light emitting quantity is varied is described by the bit number "7" of the light quantity modulation data LQMD. In addition, a varying interval DPnI with which the light emitting quantity is varied is described by the bit numbers "0+ through "4" of the light quantity modulation data LQMD.

As shown in FIG. 23, the light quantity modulator 52 includes an address counter 521, a down counter 522, a data register 523 and an up/down counter 524.

FIG. 25 is a timing chart for explaining an operation of the light quantity modulator 5 shown in FIG. 23. FIG. 25(A) shows the beam detection signal DEPT, FIG. 25(B) shows the main scan control clock SCLK, FIG. 25(C) shows the timing signal CURV, FIG. 25(D) shows an output of the down counter 522, FIG. 25(E) shows an output of the address counter 521, FIG. 25(F) shows the timing signal T1, FIG. 25(G) shows an output of the data register 523, FIG. 25(H) shows the clock signal CLK2, and FIG. 25(I) shows an output of the up/down counter 524.

As shown in FIG. 15, the data DP1 which is the first content of the light quantity modulation data LQMD read out from the RAM 35 is set in the data register 523 responsive to the timing signal $T_1$ immediately after the falling edge of the beam detection signal DEPT. The data DP1 is then loaded into the down counter 522.

During the high-level period of the timing signal CURV generated by the main scan controller 51, the CPU 33 supplies the upper limit data PREF for the light quantity of the laser diode written in the internal register 50 of the exposure controller 34 from the up/down counter 524 to a D/A converter 454 of a D/A converter group 45 shown in FIG. 26 which will be described later. But when the timing signal CURV assumes the low level, the down counter 522 generates the clock signal CLK2 and the up/down counter 524 varies its output by a data DP1V which indicates the varying quantity of the light quantity included in the data DP1 which is the content of the light quantity modulation data LQMD depending on an up/down instruction data U/D. When the up/down instruction data U/D specifies the down count, the up/down counter 524 outputs a data PREF-DP1V.

In addition, the address value of the address counter 521 is incremented in response to the clock signal CLK2 and the address value of the RAM 35 is renewed. That is, the address of the RAM 35 for making access to the data DP1 is incremented by one.

The data DP2 is read out from the next address of the RAM 35 and set in the data register 523 in synchronism with the timing signal $T_1$ Thereafter, an interval component DP21 of the data DP2 is loaded into the down counter 522 and a down count is started responsive to the main scan control clock SCLK.

When the down counter 522 underflows, the down counter 522 generates the clock signal CLK2. Hence, the up/down counter 524 varies its output by a data DP2V which indicates the varying quantity of the light quantity included in the data DP2 depending on the up/down instruction data U/D. When the up/down instruction data U/D specifies the down count, the up/down counter 524 outputs data PREF-DP1V-DP2V.

At the same time, the address value of the address counter 521 is incremented and the address value of the RAM 35 is renewed. In other words, the address of the RAM 35 for making access to the data DP2 is incremented by one.

The data DP3 is read out from the next address of the RAM 35 and set in the data register 523 in synchronism with the timing signal $T_1$. Thereafter, an interval component DP3I of the data DP3 is loaded into the down counter 522 and a down count is started responsive to the main scan control clock SCLK.

Similarly thereafter, the output of the up/down counter 524 is varied every time the clock signal CLK2 is generated, so as to control the light emitting quantity of the laser diode of the laser diode driver 60 as will be described later.

Figure 26:
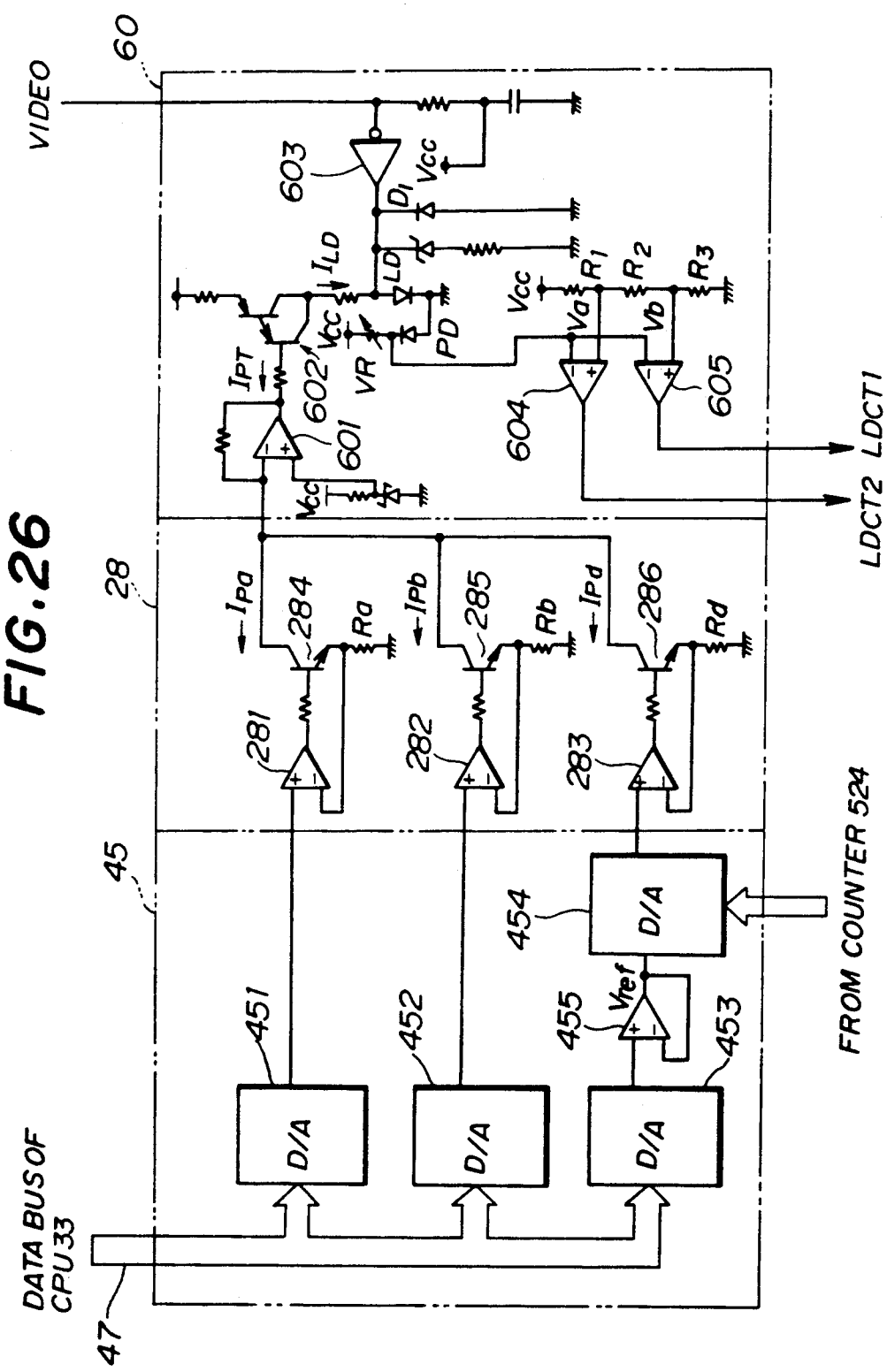
FIG. 26 is a system block diagram showing an embodiment of a circuit part including a D/A converter group, a voltage-current converter circuit and a laser diode driver.

FIG. 26 shows an embodiment of a circuit part including the D/A converter group 45, the voltage-current converter circuit 28 and the laser diode driver 60.

The D/A converter group 45 is also shown in FIG. 8 and is provided within the LSI 21 shown in FIG. 5. The D/A converter group 45 includes four D/A converters 451 through 454, and an operational amplifier 455 which is used as an impedance converter. The D/A converters 451 through 453 all have an 8-bit structure. These D/A converters 451 through 453 ar coupled to the data bus of the CPU 33 and the CPU 33 directly controls the D/A converters 451 through 453. On the other hand, the D/A converter 454 is coupled to an output terminal of the operational amplifier 455 and to the output terminal of the up/down counter 524 of the light quantity modulator 52 shown in FIG. 23 within the exposure controller 34 shown in FIG. 9. Outputs of the D/A converters 451, 452 and 454 are supplied to respective transistors 284 through 286 via respective operational amplifiers 281 through 283 of the voltage-current converter circuit 28.

Hence, the digital values input to the D/A converters 451 through 453 are converted into corresponding analog output voltages, and the analog output voltages are further converted into respective currents Ipa, Ipb and Ipd by the voltage-current converter circuit 28. The D/A converter 453 converts the digital value which is set by the CPU 33 into an analog voltage, and this analog voltage is subjected to an impedance conversion in the operational amplifier 455. An output of the operational amplifier 455 is applied to the D/A converter 454 as a reference input voltage Vref.

When the voltage-current converter circuit 28 supplies to the laser diode driver 60 a current $I_{PT}$ which is a sum of the currents Ipa, Ipb and Ipd, an operational amplifier 601 of the laser diode driver 60 amplifies this current $I_{PT}$. A power transistor 602 supplies to a laser diode LD a driving current $I_{LD}$ which is dependent on the current $I_{PT}$ so as to control the light emitting quantity of the laser diode LD.

Figure 27:
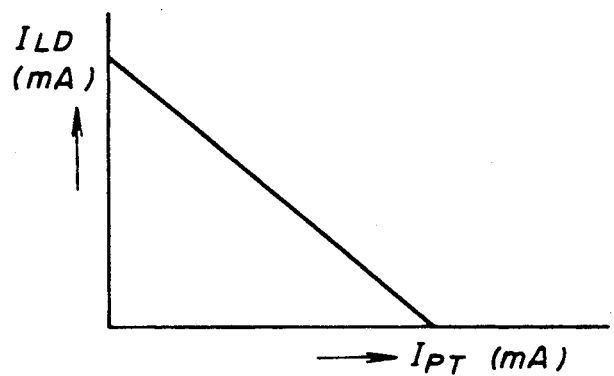
FIG. 27 is a graph showing a relationship between a current $I_{PT}$ and a driving current $I_{LD}$.

The current $I_{PT}$ and the driving current $I_{LD}$ have a relationship which is described by a first order function having a negative slope as shown in FIG. 27. Accordingly, it is possible to control the driving current $I_{LD}$ by varying the digital input values to the D/A converters 451 through 454.

The ON/OFF state of the laser diode L is controlled by the video signal VIDEO which is received from the video controller 57 shown in FIG. 9 via an inverter circuit 603. In other words, during the high-level period of the video signal VIDEO indicating the no print mode, the inverter circuit 603 outputs a low-level signal. Hence, in this state, the anode side of the laser diode LD is grounded via a diode $D_1$ and the laser diode LD turns OFF. On the other hand, during the low-level period of the video signal VIDEO indicating the print mode, the inverter circuit 603 outputs a high-level signal. Thus, in this case, the driving current $I_{LD}$ from the power transistor 602 flows to the laser diode LD and the laser diode LD turns ON.

The light emitting quantity of the laser diode LD is detected by a monitoring photodiode PD, and an output detection voltage of the photodiode PD is adjusted by a variable resistor VR. The adjusted detection voltage is supplied to comparators 604 and 605 which respectively compare the adjusted detection voltage with respective comparison voltages Va and Vb. Compared results are respectively output from the comparators 604 and 605 as binary signals LDCTI and LDCT2 and supplied to the exposure controller 34.

Figure 28:
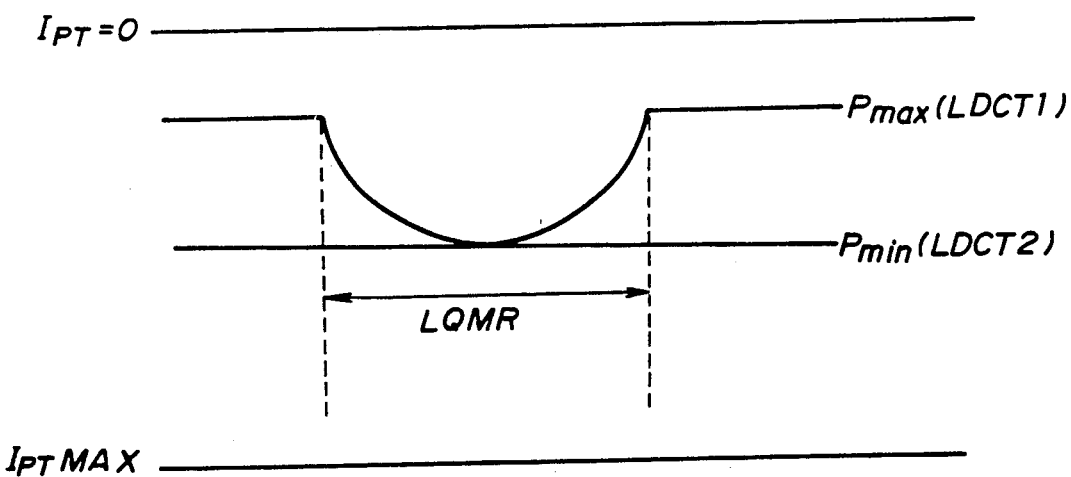
FIG. 28 is a diagram for explaining a relationship between binary signals LDCT1 and LDCT2.

The comparison voltages Va and Vb are determined by resistances of resistors R1, R2 and R3. The resistances of the resistors R1, R2 and R3 are set so that the signals LDCTI and LDCT2 are inverted in the light quantity modulation region (image data write region) LQMR respectively in correspondence with a maximum light quantity Pmax and a minimum light quantity Pmin of the laser diode LD as shown in FIG. 28.

The exposure controller 34 has an APC interrupt function. The APC interrupt is generated when the CPU 33 sets the internal register 50 of the exposure controller 34 shown in FIG. 9.

In this state, the video signal VIDEO (laser diode driving instruction signal) becomes active and the laser diode LD start to emit the laser beam.

Thereafter, the exposure controller 34 generates an interrupt signal INT with respect to the CPU 33. At the same time, the exposure controller 34 latches the values of the binary signals LDCTI and LDCT2 in the latch circuit 66 and stores the latched values in the internal register 50.

The CPU 33 reads the values of the binary signals LDCT1 and LDCT2 in the interrupt processing routine and varies the digital input values to the D/A converter 451 through 453 depending on the read values, so as to control the light emitting quantity of the laser diode LD.

The D/A converter 451 carries out a coarse control of the light quantity, while the D/A converter 452 carries out a fine control of the light quantity. Hence, the varying quantity of the current $I_{PT}$ per LSB is varied by selecting resistances of resistors Ra and Rb of the voltage-current converter circuit 28.. For example, by setting the resistances of the resistors Ra and Rb so that the LSB of the D/A converter 451 becomes equal to the 255th LSB of the D/A converter 452, it is possible to carry out a control equivalent to that of a D/A converter having a maximum of 16 bits.

Furthermore, the light quantity modulation data LQMD from the up/down counter 524 within the light quantity modulator 52 shown in FIG. 23 is supplied to the D/A converter 454 to modulate the light quantity of the laser diode LD. In other words, when the video signal VIDEO has a low level for one line to indicate the printing of all dots of the line, the driving current $I_{LD}$ for the laser diode LD generally displays a current level distribution shown in FIG. 29 with respect to the main scan direction depending on the output of the up/down counter 524 of the light quantity modulator 52 shown in FIG. 23.

The upper limit data PREF is controlled by the maximum light quantity Pmax of the laser diode LD.

Figure 29:
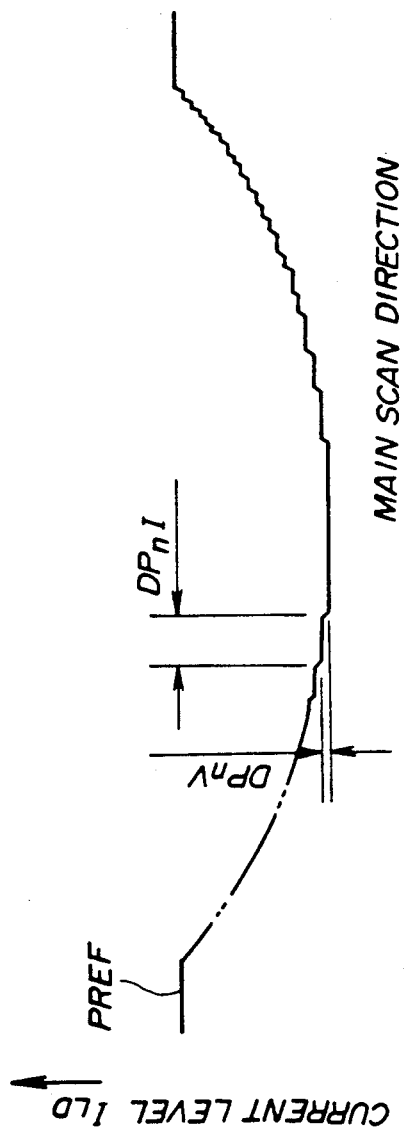
FIG. 29 is a diagram showing a relationship between a driving current for a laser diode and a main scan direction.

In FIG. 29, +DPnV (n=1, 2, 3, ...) denotes a data of varying the light quantity included in DPn which is the content of the light quantity modulation data LQMD, where "+" sign indicates an increase in the step DPnV of the current level and "−" sign indicates a decrease in the step DPnV of the current level. An interval component DPnI (n=1, 2, 3, ...) of DPn specifies the progressing quantity of the main scan. For example, DPnI indicates an increase or a decrease of the step DPnV of the current level when the main scan control clock SCLK progresses by pulse DPnI.

Next, a more detailed description will be given of the frequency modulator 53 shown in FIG. 9 in conjunction with the frequency modulation data FMD and the PLL circuit 65.

The frequency modulation data FMD is used for varying the frequency of the PLL reference signal CLKA based on a reference frequency data FINT of the PLL reference signal CLKA which is written in the internal register 50 of the exposure controller 34 by the CPU 33 shown in FIG. 8.

As shown in FIG. 31, the frequency modulation data FMD is made up of one byte including a varying quantity DFmV for varying the frequency of the PLL reference signal CLKA, a data U/D for changing the direction, and a data DFmI indicating the varying interval. The varying quantity DFmV is indicated by the bit numbers "5" and "6", the data U/D is indicated by the bit number "7", and the data DFmI is indicated by the bit numbers "0+ through "4".

Figure 30:
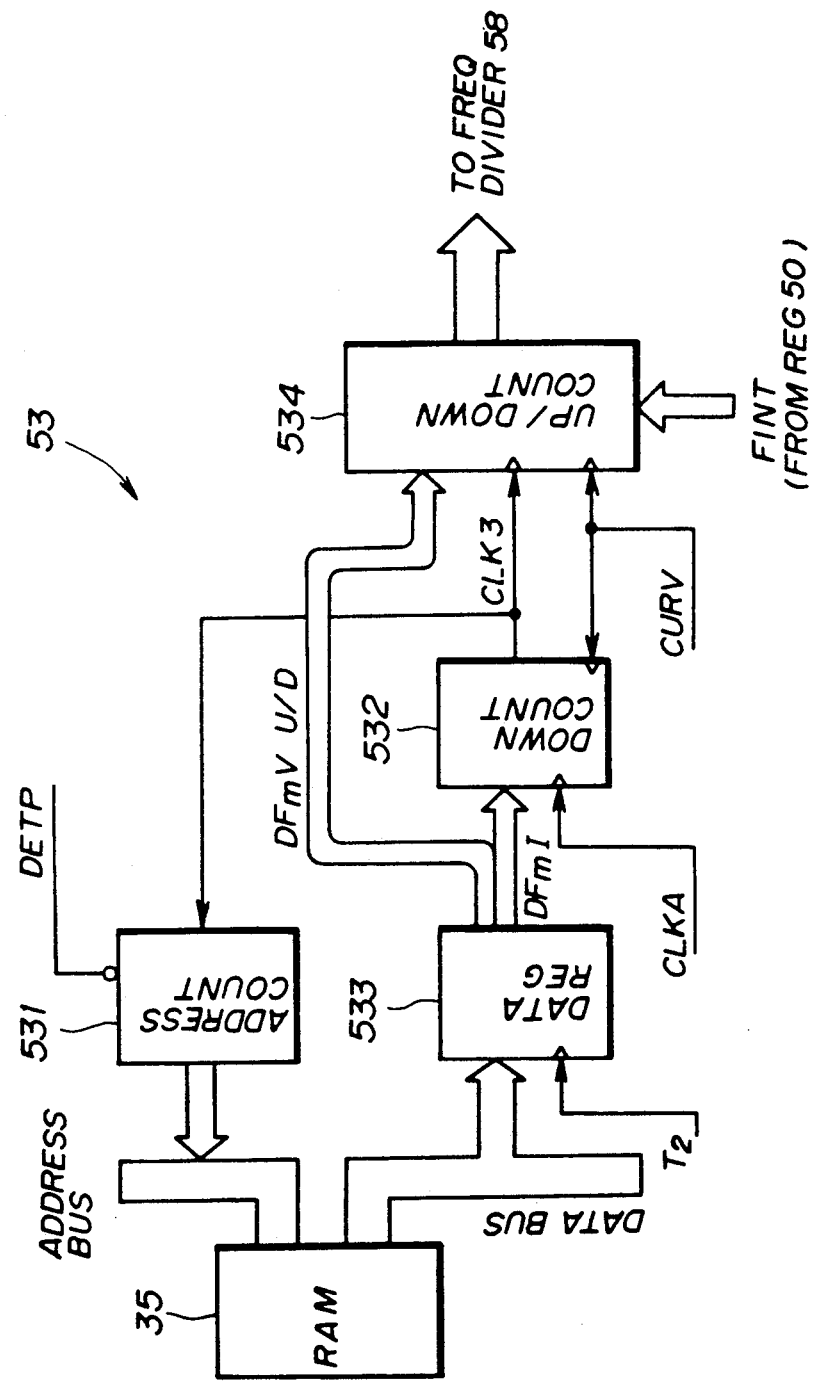
FIG. 30 is a system block diagram showing an embodiment of a frequency modulator shown in FIG. 9.

FIG.30 shows an embodiment of the frequency modulator 53 together with the RAM 35. The frequency modulator 53 includes an address counter 531, a down counter 532, a data register 533 and an up/down counter 534. The frequency modulator 53 supplies the data for specifying the frequency of the PLL reference signal CLKA to the frequency divider 58 shown in FIG. 9, so that the frequency divider 58 generates the PLL reference signal CLKA having the specified frequency.

The frequency divider 58 is a down counter. When the frequency divider 58 counts a number of reference clock signals CLK0 from the tap selector 64 amounting to the number of frequency data received from the frequency modulator 53, the frequency divider 58 generates a pulse having a length amounting to ten reference clock signals CLK0. This operation is repeated, and the pulses generated by the frequency divider 58 is output as the PLL reference signal CLKA.

When the frequency data supplied by the frequency modulator 53 does not vary, the frequency divider 58 outputs the PLL reference signal CLKA which has a constant pulse width and a constant period. However, when the frequency data supplied by the frequency modulator 53 varies, the frequency divider 58 outputs the PLL reference signal CLKA which has the same pulse width but a different period.

FIG. 32 is a timing chart for explaining the operation of the frequency modulator 53. FIG. 32(A) shows the beam detection signal DETP, FIG. 32(B) shows the reference clock signal CLK0, FIG. 32(C) shows the PLL reference signal CLKA, FIG. 32(D) shows the timing signal CURV, FIG. 32(E) shows the output of the down counter 532, FIG. 32(F) shows the output of the address counter 531, FIG. 32(G) shows the timing signal $T_2$, FIG. 32(H) shows the output of the data register 533, FIG. 32(I) shows a clock signal CLK3, and FIG. 32(J) shows the output of the up/down counter 534.

The first data DFI of the frequency modulation data FMD which is read out from the RAM in response to the timing signal $T_2$ immediately after the falling edge of the beam detection signal DEPT is set in the data register 533 of the frequency modulator 53, and an interval component DFII of this data DFl is loaded into the down counter 532.

During a high-level period of the timing signal CURV which is generated from the main scan controller 51, the up/down counter 534 supplies to the frequency divider 58 the reference frequency data FINT of the PLL reference signal CLKA which is written into the internal register 50 of the exposure controller 34 by the CPU 33. On the other hand, when the level of the timing signal CURV becomes low, the up/down counter 534 carries its output by the data DF1V of the varying quantity of the frequency included in the data DFI which is the content of the frequency modulation data FMD depending on the up/down instruction data U/D. Hence, when the up/down instruction data U/D specifies the down count, for example, the up/down counter 534 supplies a data FINT-DF1V to the frequency divider 58.

In addition, the address value of the address counter 531 is incremented in response to the clock signal CLK3 and the address value of the RAM 35 is renewed. In other words, the address of the RAM 35 for making access to the data DF1 is incremented by one.

After the data DF2 is read out from the next address of the RAM 35 and set in the data register 533 in synchronism with the timing signal $T_2$, the interval component DF2I of the data DF2 is loaded into the down counter 532 which starts a down count responsive to the PLL reference signal CLKA.

The down counter 532 generates clock a signal CLK3 when an underflow occurs, and the output of the up/down counter 534 is varied by the data DF2V of the varying quantity of the frequency included in the data DF2 depending on the up/down instruction data U/D. For example, when the up/down instruction data U/D specifies the down count, the up/down counter 534 supplies a data FINT-DF1V-DF2V to the frequency divider 58.

At the same time, the address value of the address counter 531 is incremented and the address value of the RAM 35 is renewed. That is, the address of the RAM 35 for making access to the data DF2 is incremented by one.

After the data DF3 is read out from the next address of the RAM 35 and set in the data register 533 in synchronism with the timing signal $T_2$, the interval component DF3I of the data DF3 is loaded into the down counter 532 which starts a down count responsive to the PLL reference signal CLKA.

Similarly, thereafter, the clock signal CLK3 is generated and the output of the up/down counter 534 which is supplied to the frequency divider 58 is varied so as to modulate the PLL reference signal CLKA.

Because the frequency modulator 53 varies the counted value which is supplied to the frequency divider 58, the frequency of the PLL reference signal CLKA which is generated from the frequency divider 58 varies accordingly.

Figure 33:
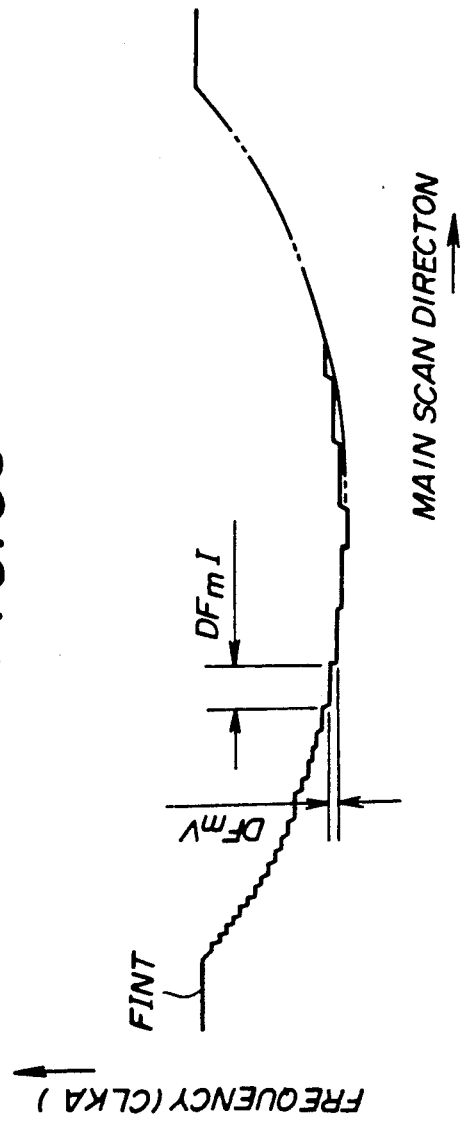
FIG. 33 is a diagram showing a relationship of a frequency included in the frequency modulation data and the main scan direction.

By the above described operations of the frequency modulator 53 and the frequency divider 58, the PLL reference signal CLKA is prestored in the ROM 30 shown in FIG. 5 as generally shown in FIG. 33. In other words, the PLL reference signal CLKA displays a frequency modulation distribution in the main scan direction as shown in FIG. 33 which is restricted by the frequency modulation data FMD which is written in the RAM 35 by the CPU shown in FIG. 8 and the reference frequency data FINT of the PLL reference signal CLKA.

In FIG. 33, ±DFmV (m=1, 2, 3, ...) denotes a data for varying the frequency included in DFm which is the content of the frequency modulation data FMD, where "+" sign indicates an increase in the step DFmV of the current level and "−" sign indicates a decrease in the step DFmV of the current level. An interval component DFmI (m=1, 2, 3, ...) of DFm specifies the progressing quantity of the main scan. For example, DFmI indicates an increase or a decrease of the step DFmV of the frequency of the PLL reference signal CLKA when the main scan control clock SCLK progresses by pulse DFmI.

In FIG. 9, the PLL reference signal CLKA which is generated from the frequency divider 58 is supplied to the phase comparator 61. As described above, this phase comparator 61 forms the PLL circuit 65 which generates the pixel clock signal WCLK which has a frequency specified by the frequency modulator 53 together with the frequency divider 59 the VCO 62 and the external lowpass filter 68.

The VCO 62 of the PLL circuit 65 supplies to the video controller 57 and the frequency divider 63 the pixel clock signal WCLK which is synchronized to the PLL reference signal CLKA. As a result, the video controller 57 serially reads the image data from the data controller 13 in synchronism with the pixel clock signal WCLK and processes the read image data into the video signal VIDEO. This video signal VIDEO is supplied to the laser diode driver 60 shown in FIG. 26.

The driving current $I_{LD}$ having the current level distribution shown in FIG. 29 is supplied to the laser diode LD within the laser diode unit 10 shown in FIGS. 2 and 3 by the above described operations of the light quantity modulator 52 and the frequency modulator 53 and the light quantity modulation data LQMD and the frequency modulation data FMD which are prestored in the ROM 30 and selectively written into the RAM 35 by the CPU 33.

In addition, since the frequency of the pixel clock signal WCLK has a frequency distribution which is obtained by multiplying a value to the PLL reference signal CLKA which has the frequency modulation distribution shown in FIG. 33 the dot printing of one line in the main scan direction is carried out in synchronism with the pixel clock signal WCLK.

The current level distribution shown in FIG. 29 and the frequency modulation distribution shown in FIG. 33 can respectively be obtained by setting (modifying) the light quantity modulation data LQMD and the frequency modulation data FMD.

Accordingly, in this embodiment, the four groups of data shown in FIGS. 7A through 7D are stored in the ROM 30 which respectively correspond to the four kinds of laser scan units. An arbitrary one of the four groups of data can be selected from the dip switch 31.

Among different kinds of laser units, there may exist a deviation in the respective scan regions. Hence, the main scan control data MSCD is also stored in four groups of data in the ROM 3 which respectively correspond to the four kinds of laser scan units. Each group of data stored in the ROM 30 corresponds to one of the four printing pixel densities.

Further, the present invention is not limited to these embodiments, but various variations and modifications may be made without departing from the scope of the present invention.

What is claimed is:

1. An image forming apparatus comprising:
   image forming means for forming an image described by a video signal on a recording sheet by carrying out an image forming operation which includes scans in main and sub scan directions;
   storage means for storing test pattern data which describes at least one test pattern to be formed on the recording sheet;
   generator means coupled to said storage means for generating a generation interval of the video signal in the main and sub scan directions responsive to the test pattern data stored in said storage means; and
   control means coupled to said storage means and said generator means for controlling the image forming operation of said image forming means by supplying to said image forming means the video signal which describes an arbitrary test pattern and is generated based on the test pattern data read from said storage means with the generation interval generated by said generator means.

2. The image forming apparatus as claimed in claim 1, which further comprises setting means for storing in said storage means test pattern data related to a plurality of arbitrary test patterns which are mutually different.

3. The image forming apparatus as claimed in claim 2, wherein said control means includes selection means for selectively reading an arbitrary one of the test pattern data from said storage means 4. The image forming apparatus as claimed in claim 1, wherein said image forming means includes a laser scan unit for forming the image by use of a laser beam, said video signal supplied to said image forming means modulating the laser beam emitted from said laser scan unit.

5. The image forming apparatus as claimed in claim 4, which further comprises memory means for storing main scan control data, light quantity modulation data and frequency modulation data for controlling the laser beam emission of said laser scan unit in correspondence with a plurality of kinds of laser scan units, said control means selectively using the main scan control data, the light quantity modulation data and the frequency modulation data for the kind of laser scan unit used when controlling the laser beam emitted from said laser scan unit.

6. The image forming apparatus as claimed in claim 1, wherein said generator means generates the generation interval of the video signal in the main and sub scan directions for a repeating pattern which is repeated to form one test pattern 7. The image forming apparatus as claimed in claim 1, wherein said test pattern when formed on the recording sheet is used for checking an operating state of said image forming apparatus and a picture quality of the image which is formed by said image forming means.

* * * * *